United States Patent
Tu et al.

(10) Patent No.: US 11,569,916 B2
(45) Date of Patent: Jan. 31, 2023

(54) COHERENT DETECTION IMPLEMENTING APPARATUS, SYSTEM AND METHOD

(71) Applicant: ZTE Corporation, Shenzhen (CN)

(72) Inventors: Zhijuan Tu, Shenzhen (CN); Junwen Zhang, Shenzhen (CN); Xingang Huang, Shenzhen (CN); Mingsheng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/271,915

(22) PCT Filed: Aug. 27, 2019

(86) PCT No.: PCT/CN2019/102847
§ 371 (c)(1),
(2) Date: Feb. 26, 2021

(87) PCT Pub. No.: WO2020/043096
PCT Pub. Date: Mar. 5, 2020

(65) Prior Publication Data
US 2021/0320723 A1    Oct. 14, 2021

(30) Foreign Application Priority Data
Aug. 27, 2018    (CN) .......................... 201810979514.4

(51) Int. Cl.
*H04B 10/40*    (2013.01)
*H04B 10/61*    (2013.01)
(Continued)

(52) U.S. Cl.
CPC ........... *H04B 10/614* (2013.01); *H04B 10/40* (2013.01); *H04B 10/516* (2013.01);
(Continued)

(58) Field of Classification Search
CPC .... H04B 10/614; H04B 10/40; H04B 10/516; H04B 10/572; H04B 10/6151;
(Continued)

(56) References Cited

U.S. PATENT DOCUMENTS 4,712,859 A   12/1987  Albanese
5,052,051 A *  9/1991  Naito .................. H04B 10/614
                                                        398/204
(Continued)

FOREIGN PATENT DOCUMENTS

CN        102483488 A      5/2012
CN        103733547 A      4/2014
(Continued)

OTHER PUBLICATIONS

European Search Report for corresponding application 19 853 630.2; Report dated Oct. 19, 2021.
(Continued)

*Primary Examiner* — Dibson J Sanchez
(74) *Attorney, Agent, or Firm* — Cantor Colburn LLP

(57) ABSTRACT

Provided is a coherent detection implementing apparatus, system and method. The apparatus includes: a first transceiver unit, configured to send an optical signal in a first direction to a second device, wherein the optical signal in the first direction includes a direct current optical signal with a first wavelength and a modulated optical signal with a second wavelength; and configured to receive an optical signal in a second direction from the second device; and a first coherent receiver, connected with the first transceiver unit, and configured to take a part of the direct current optical signal with the first wavelength in the optical signal in the first direction as a Local Oscillator (LO) light for coherent reception, perform coherent frequency mixing between the LO light and the optical signal in the second
(Continued)

OLT

ONU direction, and demodulate the optical signal in the second direction.

8 Claims, 9 Drawing Sheets

(51) Int. Cl.
*H04B 10/516* (2013.01)
*H04B 10/572* (2013.01)
*H04B 10/63* (2013.01)
*H04B 10/50* (2013.01)
*H04B 10/2587* (2013.01)
*H04B 10/64* (2013.01)

(52) U.S. Cl.
CPC ....... *H04B 10/572* (2013.01); *H04B 10/6151* (2013.01); *H04B 10/2587* (2013.01); *H04B 10/506* (2013.01); *H04B 10/63* (2013.01); *H04B 10/64* (2013.01); *H04B 10/65* (2020.05)

(58) Field of Classification Search
CPC .. H04B 10/63; H04B 10/2587; H04B 10/506; H04B 10/65; H04B 10/64; H04B 10/615; Y02D 30/70
USPC ..................................... 398/43–103, 135–139
See application file for complete search history.

(56) References Cited

U.S. PATENT DOCUMENTS

| | | | | |
|---|---|---|---|---|
| 7,421,211 B2* | 9/2008 | Hayashi | ................. | G02F 1/0356 396/175 |
| 9,143,231 B2* | 9/2015 | Yu | ........................... | H04B 10/11 |
| 9,203,517 B2 | 12/2015 | Zhou | | |
| 9,300,399 B2* | 3/2016 | Campos | ........... | H04B 10/25751 |
| 2003/0072060 A1 | 4/2003 | Sourani | | |
| 2008/0279559 A1* | 11/2008 | Yu | .................... | H04B 10/25758 398/118 |
| 2009/0274462 A1* | 11/2009 | Yu | ...................... | H04B 10/2587 398/68 |
| 2010/0111533 A1* | 5/2010 | Beckett | ............... | H04J 14/0282 398/68 |
| 2010/0142955 A1* | 6/2010 | Yu | ......................... | H04J 14/025 398/115 |
| 2010/0215368 A1* | 8/2010 | Qian | ................... | H04J 14/0252 398/67 |
| 2014/0255031 A1* | 9/2014 | Chow | ................ | H04Q 11/0067 398/68 |
| 2014/0348507 A1* | 11/2014 | Zhou | .................... | H04B 10/272 398/65 |
| 2015/0381285 A1* | 12/2015 | Gripp | ................. | H04B 10/6166 398/202 |
| 2016/0112118 A1 | 4/2016 | Rahn | | |
| 2016/0261346 A1* | 9/2016 | Li | ........................ | H04B 10/63 |
| 2017/0126315 A1* | 5/2017 | Saito | .................... | H04B 10/572 |
| 2017/0294966 A1* | 10/2017 | Jia | ........................ | H04B 10/532 |
| 2019/0229811 A1* | 7/2019 | Gupta | .................. | H04B 10/614 |
| 2019/0268074 A1* | 8/2019 | Jia | ........................ | H04B 10/532 |
| 2019/0393962 A1* | 12/2019 | Zhang | ...................... | G02F 1/21 |
| 2021/0067244 A1* | 3/2021 | Dong | .................... | H04B 10/25 |

FOREIGN PATENT DOCUMENTS

| | | |
|---|---|---|
| CN | 107408991 A | 11/2017 |
| CN | 107466448 A | 12/2017 |
| ES | 2629316 T3 | 8/2017 |

OTHER PUBLICATIONS

International Search Report for corresponding application PCT/CN2019/102847 filed Aug. 27, 2019; dated Dec. 4, 2019.

* cited by examiner

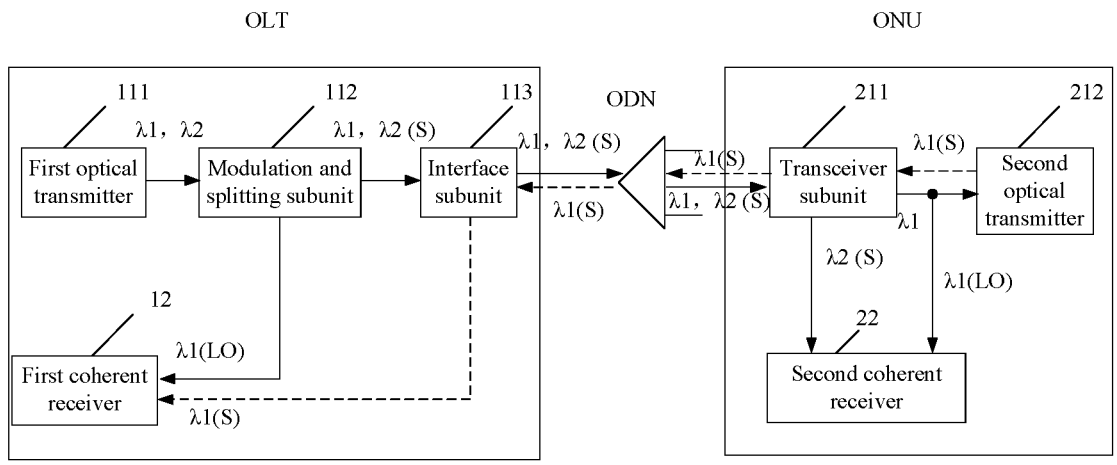

Fig. 17

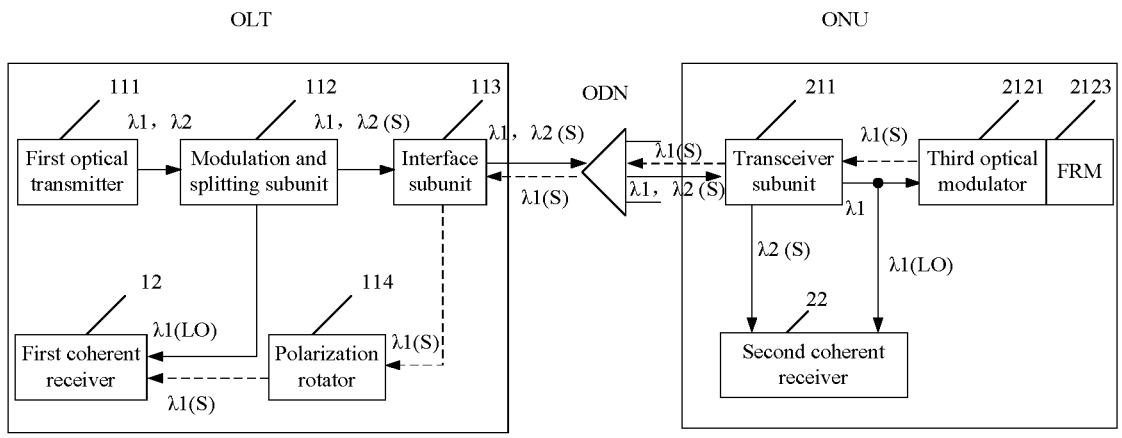

Fig. 18

| 401 |
| --- |
| A first device sends an optional signal in a first direction to a second device, wherein the optional signal in the first direction includes a direct current optical signal with a first wavelength and a modulated optical signal with a second wavelength |

| 402 |
| --- |
| The first device receives an optical signal in a second direction from the second device, takes a part of the direct current optical signal with the first wavelength in the optical signal in the first direction as an LO light for coherent reception, performs coherent frequency mixing between the LO light and the optical signal in the second direction, and demodulates the optical signal in the second direction, wherein the optical signal in the second direction includes a modulated optical signal with the first wavelength |

Fig. 19

COHERENT DETECTION IMPLEMENTING APPARATUS, SYSTEM AND METHOD

CROSS-REFERENCE TO RELATED APPLICATIONS

This application claims priority to Chinese patent application No. 201810979514.4, filed before the China National Intellectual Property Administration (CNIPA) on Aug. 27, 2018 and entitled "Coherent Detection Implementing Apparatus, System and Method", the content of which is hereby incorporated by reference in its entirety.

TECHNICAL FIELD

The disclosure relates, but is not limited, to the technical field of optical communications, in particular to a coherent detection implementing apparatus, system and method.

BACKGROUND

At present, coherent detection technology has become an important development direction of an optical communication system. Power budget and cost are two important considerations in building the optical communication system. Because of the introduction of Local Oscillator (LO) light, the coherent detection technology can significantly improve the receiving sensitivity of the system, reduce the power requirement for the received signal light, and thereby alleviate the bandwidth and power constraints of the traditional optical communication system.

The main components of a coherent receiver specified in the Optical Internetworking Forum (OIF) standard are shown in FIG. 1. For a coherent detection system, it is necessary to introduce an LO laser to provide the LO light. In order to achieve the coherent detection with the maximum sensitivity, the signal light and the LO light need to meet the following conditions: the signal light and the LO light need to have the same polarization state, the same frequency or a stable frequency difference, and limited phase noise. Therefore, in order to enable the central wavelength of the LO light to keep consistent with the central wavelength of the signal light, it is necessary to use a high-precision tunable laser as an LO light source for coherent detection. In order to reduce the phase noise, the line width of the used LO laser is required to be extremely narrow, which results in high cost and high price of the coherent detection system.

SUMMARY

The embodiments of the disclosure provide a coherent detection implementation device, system and method to reduce cost and complexity.

A first aspect of the embodiments of the disclosure provides a coherent detection implementing apparatus, which includes: a first transceiver unit and a first coherent receiver. The first transceiver unit is configured to send an optical signal in a first direction to a second device, wherein the optical signal in the first direction includes a direct current optical signal with a first wavelength and a modulated optical signal with a second wavelength. The first transceiver unit is also configured to receive an optical signal in a second direction from the second device, wherein the optical signal in the second direction includes a modulated optical signal with the first wavelength. The first coherent receiver is connected with the first transceiver unit, and configured to take a part of the direct current optical signal with the first wavelength in the optical signal in the first direction as an LO light for coherent reception, perform coherent frequency mixing between the LO light and the optical signal in the second direction, and demodulate the optical signal in the second direction.

A second aspect of the embodiments of the disclosure provides a coherent detection implementing apparatus, which includes: a second transceiver unit and a second coherent receiver. The second transceiver unit is configured to receive an optical signal in a first direction from a first device, wherein the optical signal in the first direction includes a direct current optical signal with a first wavelength and a modulated optical signal with a second wavelength. The second coherent receiver is connected with the second transceiver unit, and is configured to take a part of the direct current optical signal with the first wavelength as an LO light for coherent reception, perform coherent frequency mixing between the LO light and the modulated optical signal with the second wavelength, and demodulate the modulated optical signal with the second wavelength.

The embodiments of the disclosure also provide a coherent detection implementing system, which includes a first device and a second device that is connected with the first device through an optical fiber link. The first device includes the coherent detection implementing apparatus in the first aspect of the embodiments of the disclosure, and the second device includes the coherent detection implementing apparatus in the second aspect of the embodiments of the disclosure.

The embodiments of the disclosure also provide a coherent detection implementing method, which includes the following operations. A first device sends an optical signal in a first direction to a second device, wherein the optical signal in the first direction includes a direct current optical signal with a first wavelength and a modulated optical signal with a second wavelength. The first device receives an optical signal in a second direction from the second device, takes a part of the direct current optical signal with the first wavelength in the optical signal in the first direction as an LO light for coherent reception, performs coherent frequency mixing between the LO light and the optical signal in the second direction, and demodulates the optical signal in the second direction. The optical signal in the second direction includes a modulated optical signal with the first wavelength.

The embodiments of the disclosure also provide a coherent detection implementing method, which includes the following operations. A second device receives an optical signal in a first direction from a first device, wherein the optical signal in the first direction includes a direct current optical signal with a first wavelength and a modulated optical signal with a second wavelength. The second device takes a part of the direct current optical signal with the first wavelength as an LO light for coherent reception, performs coherent frequency mixing between the LO light and the modulated optical signal with the second wavelength, and demodulates the modulated optical signal with the second wavelength.

The embodiments of the disclosure also provide a coherent detection implementing method, which includes the following operations. A first device sends an optical signal in a first direction to a second device, wherein the optical signal in the first direction includes a direct current optical signal with a first wavelength and a modulated optical signal with a second wavelength. The second device receives the optical signal in the first direction from the first device, takes a part of the direct current optical signal with the first wavelength as an LO light for coherent reception, performs coherent frequency mixing between the LO light and the modulated optical signal with the second wavelength, and demodulates the modulated optical signal with the second wavelength.

In the embodiments of the disclosure, a first device sends an optical signal in a first direction to a second device, wherein the optical signal in the first direction includes a direct current optical signal with a first wavelength and a modulated optical signal with a second wavelength. The second device receives the optical signal in the first direction from the first device, takes a part of the direct current optical signal with the first wavelength as an LO light for coherent reception, performs coherent frequency mixing between the LO light and the modulated optical signal with the second wavelength, and demodulates the modulated optical signal with the second wavelength. In the embodiments of the disclosure, the cost and complexity of coherent detection are reduced by saving an LO laser used for coherent reception.

Other characteristics and advantages of the disclosure will be elaborated in the subsequent specification. A part of characteristics and advantages of the disclosure becomes apparent based on the specification or becomes known through implementation of the disclosure. The purposes and other advantages of the disclosure may be realized and obtained through the structures specified in the specification, the claims and the accompanying drawings.

BRIEF DESCRIPTION OF THE DRAWINGS

The accompanying drawings described herein are used to provide a deeper understanding of the technical solutions of the present disclosure, and constitute a part of the specification. The exemplary embodiments of the present disclosure and the accompanying drawings are used to explain the technical solutions of the present disclosure. The drawings and the exemplary embodiments do not constitute limitations to the technical solutions of the present disclosure. In the drawings:

FIG. 17 is a schematic diagram of a coherent detection implementing system according to an application example of the disclosure.

FIG. 18 is a schematic diagram of a coherent detection implementing system according to another application example of the disclosure.

FIG. 19 is a flowchart of a coherent detection implementing method (applied to a first device) according to an embodiment of the disclosure.

DETAILED DESCRIPTION OF THE EMBODIMENTS

The embodiments of the present disclosure are described below with reference to the drawings in detail. It is to be noted that embodiments in the present application and characteristics in the embodiments may be combined to derive other embodiments not explicitly described.

Figure 1:
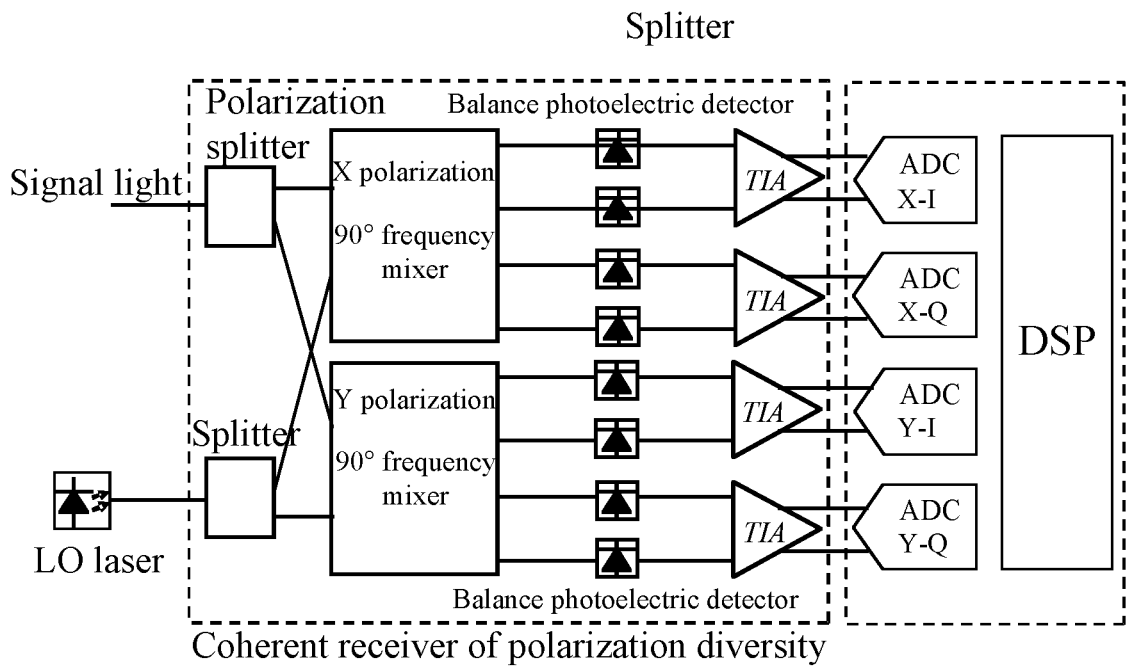
FIG. 1 is a schematic diagram of main components of a coherent receiver specified in the OIF standard.

In order to reduce the cost of system, in a coherent detection system, data of a part of a modulated signal may be erased by some technical means and the remaining part of signal may be used as an LO light, thus saving an LO laser. However, additional envelope detector, semiconductor optical amplifier and narrow-band optical filter need to be introduced in order to achieve this scheme, which increases the complexity and cost of the system. Besides, it is difficult to completely erase the modulated signal. In addition, because a polarization state of signal light is random after the signal light is transmitted through an ordinary optical fiber, a coherent receiver usually adopts the way of polarization diversity shown in FIG. 1 to respectively receive two polarization state components of an optical signal, which doubles the complexity of the coherent receiver and greatly increases the cost of the coherent detection system.

In addition, because the signal light and the LO light are from different lasers, which makes it difficult to achieve stable and accurate matching of frequency and phase. Therefore, after Analog-to-Digital Conversion (ADC) is performed, a Digital Signal Processing (DSP) algorithm is still needed to correct a frequency and eliminate a phase noise, which further increases the complexity of the coherent detection system. It can be concluded from the above analysis that cost and system complexity are important factors that lead to the failure of scale application of the coherent detection technology in a Passive Optical Network (PON) system.

The embodiments of the disclosure provide a coherent detection implementation device, system and method, which may simplify structure and reduce cost.

Figure 2:
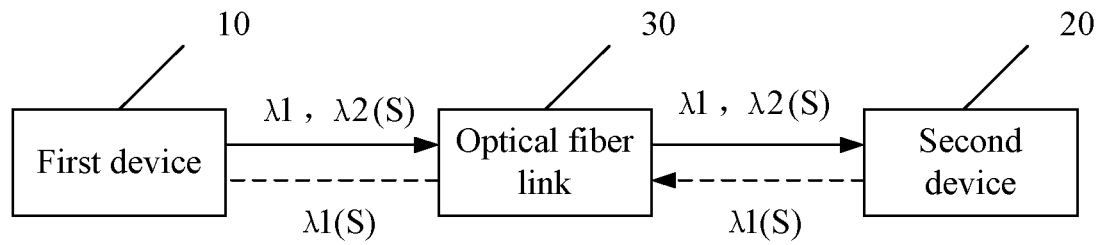
FIG. 2 is a schematic diagram of a coherent detection implementing system according to an embodiment of the disclosure.

As shown in FIG. 2 that is a schematic diagram of a coherent detection implementing system according to an embodiment of the disclosure, the system includes a first device 10 and a second device 20 that is connected with the first device 10 through an optical fiber link 30.

The first device 10 sends an optical signal in a first direction (represented by the solid line) to the second device 20. The optical signal in the first direction includes a direct current optical signal λ1 with a first wavelength and a modulated optical signal λ2(S) with a second wavelength. The second device 20 sends an optical signal in a second direction (represented by the dashed line) to the first device 10. The optical signal in the second direction includes a modulated optical signal λ1(S) with the first wavelength.

The first device 10 generates optical signals λ1 and λ2 of two wavelengths in the first direction, modulates the optical signal of one wavelength to obtain λ2(S), and splits a part of direct current light λ1. When λ1(S) in the second direction arrives, coherent frequency mixing is directly performed between λ1(S) and the split LO light λ1 to achieve coherent reception. After the optical signals λ1 and λ2(S) in the first direction arrive, the second device 20 separates the light of the two wavelengths. The second device 20 divides the direct current light λ1 into two parts. One part of the direct current light λ1 is used as the LO light, and the second device 20 performs coherent frequency mixing between the LO light and the modulated optical signal λ2(S) with the second wavelength in the optical signal in the first direction to achieve coherent reception. The other part of the direct current light is modulated and reflected to generate the optical signal in the second direction, that is, the modulated optical signal λ1(S) with the first wavelength.

The embodiments of the disclosure may be applied to, but not limited to, a PON system. The first device 10 may be an Optical Line Terminal (OLT). The second device 20 may be an Optical Network Unit (ONU). The first direction may be a downstream direction, and the second direction may be an upstream direction. The OLT is connected with the ONU through an Optical Distribution Network (ODN).

The first device 10 and the second device 20 are respectively described below.

Figure 3:
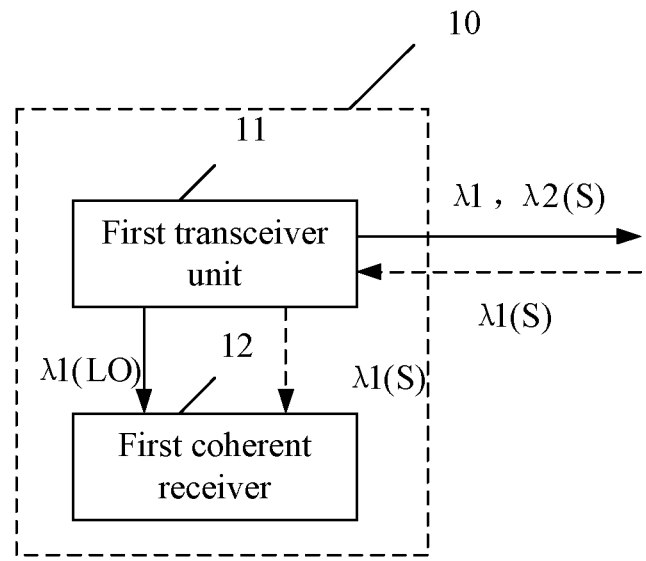
FIG. 3 is a schematic diagram of a coherent detection implementing apparatus (applied to a first device) according to an embodiment of the disclosure.

For the first device 10, as shown in FIG. 3, a coherent detection implementing apparatus is in the first device 10. The coherent detection implementing apparatus includes: a first transceiver unit 11 and a first coherent receiver 12. The first transceiver unit 11 is configured to send an optical signal in a first direction to the second device 20, wherein the optical signal in the first direction includes a direct current optical signal with a first wavelength and a modulated optical signal with a second wavelength. The first transceiver unit 11 is also configured to receive an optical signal in a second direction from the second device 20, wherein the optical signal in the second direction includes a modulated optical signal with the first wavelength. The first coherent receiver 12 is connected with the first transceiver unit, and configured to take a part of the direct current optical signal with the first wavelength in the optical signal in the first direction as an LO light for coherent reception, perform coherent frequency mixing between the LO light and the optical signal in the second direction, and demodulate the optical signal in the second direction.

In the embodiments of the disclosure, the cost and complexity of coherent detection are reduced by saving an LO laser used for coherent reception.

Figure 4:
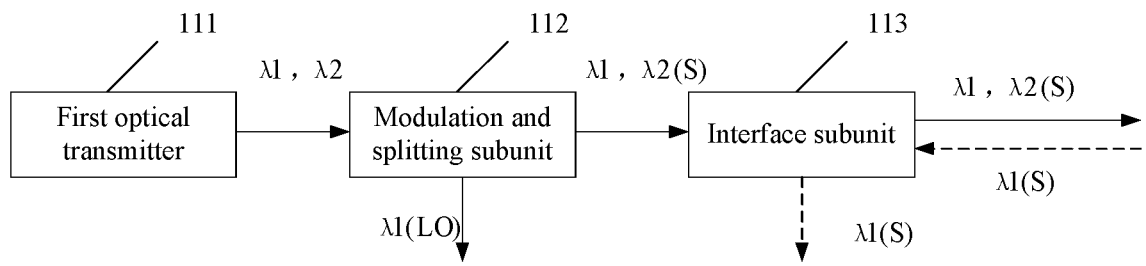
FIG. 4 is a schematic diagram of a first transceiver unit according to an embodiment of the disclosure.

As shown in FIG. 4, in an embodiment, the first transceiver unit 11 includes a first optical transmitter 111, a modulation and splitting subunit 112 and an interface subunit 113 that are connected successively. The first optical transmitter 111 is configured to generate an optical signal to be modulated. The optical signal to be modulated includes the direct current optical signal with the first wavelength and a direct current optical signal with the second wavelength.

The modulation and splitting subunit 112 is configured to modulate the direct current optical signal with the second wavelength in the optical signal to be modulated to obtain the modulated optical signal with the second wavelength.

The interface subunit 113 is configured to take the direct current optical signal with the first wavelength and the modulated optical signal with the second wavelength as the optical signal in the first direction, send the optical signal in the first direction to the second device 20, and receive the optical signal in the second direction from the second device 20 and send the optical signal in the second direction to the first coherent receiver 12.

In the embodiments of the disclosure, the optical signal in the first direction adopts optical signals of two wavelengths, one of which can be used for modulation while the other of which (the direct current light) can be directly used as the LO light. Compared with a single wavelength based upstream and downstream scheme, the scheme in the embodiments can avoid the use of a complex device for erasing modulation data.

Figure 5:
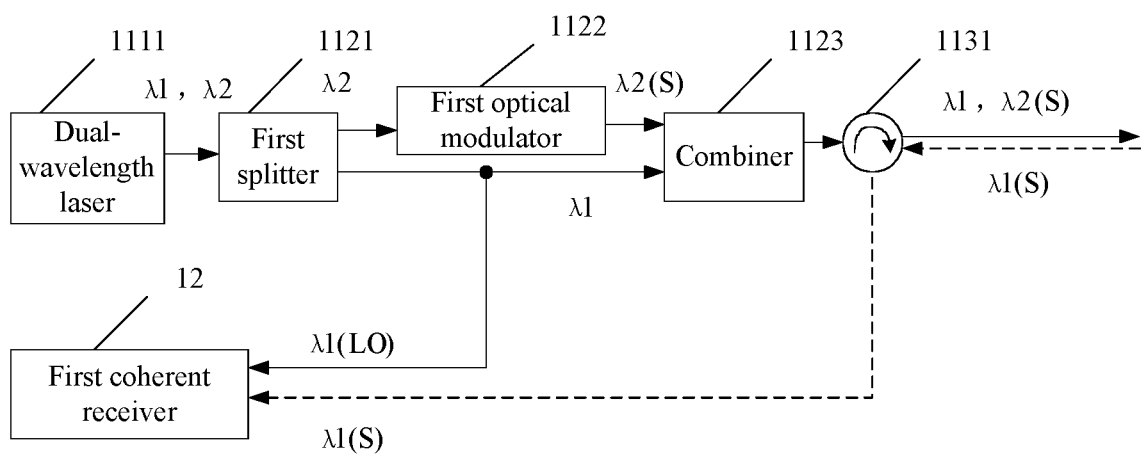
FIG. 5 is a schematic diagram of a first device according to an embodiment of the disclosure.

With reference to FIG. 5, in an embodiment, the first optical transmitter 111 includes a dual-wavelength laser 1111. The dual-wavelength laser 1111 is configured to generate the optical signal to be modulated.

The light emitted by the dual-wavelength laser 1111 includes signals of two wavelengths with a constant frequency difference. If the environment changes, the two wavelengths change simultaneously, but the frequency difference remains constant.

Because the two wavelengths in the optical signal in the first direction originate from the same laser, the frequency difference is constant and adjustable. As such, there is no need to continuously adjust the wavelength of the LO light with the change of environment and temperature, which reduces the complexity of the system implementation and operation and is conducive to realizing scale applications. The laser may be realized by using, but not limited to, a Distributed Feedback Laser (DFB) based on an adjustable sampling grating period. Alternatively, the laser may be realized by using, but not limited to, a dual-wavelength semiconductor laser based on a V-type coupled cavity.

With reference to FIG. 5, in an embodiment, the modulation and splitting subunit 112 includes a first splitter 1121, a first optical modulator 1122 and a combiner 1123 that are connected successively.

The first splitter 1121 is configured to split the optical signal to be modulated into two beams, one of which is the direct current optical signal with the first wavelength and the other of which is the direct current optical signal with the second wavelength, send a part of the beam of the direct current optical signal with the first wavelength to the first coherent receiver 12 and send the other part of the beam of the direct current optical signal with the first wavelength to the combiner 1123, and send the beam of the direct current optical signal with the second wavelength to the first optical modulator 1122.

The first optical modulator 1122 is configured to modulate the received direct current optical signal with the second wavelength to obtain the modulated optical signal with the second wavelength, and send the modulated optical signal with the second wavelength to the combiner 1123.

The combiner 1123 is configured to combine the received direct current optical signal with the first wavelength and the modulated optical signal with the second wavelength into one beam, and send the combined beam to the interface subunit 113.

The first splitter 1121 and the combiner 1123 may be implemented by the same device, and may realize an optical demultiplexing/multiplexing function. The first splitter 1121 and the combiner 1123 may be realized by using an Arrayed Waveguide Grating (AWG) or through a micro-ring resonator or other structures.

The first optical modulator 1122 may realize the modulation of the optical signal in the first direction, and may be realized by using, but not limited to, an Electricity Absorb (EA) modulator, a Mach-Zehnder (MZ) modulator, a microring resonator, etc. During practical implementation, different optical modulators may be selected according to modulation formats required by the system.

With reference to FIG. 5, in an embodiment, the interface subunit 113 may include an optical circulator 1131.

With reference to FIG. 5, the operating process of the coherent detection implementing apparatus is described below. The dual-wavelength laser 1111 emits an optical signal including two wavelengths λ1 and λ2, and the frequency difference between λ1 and λ2 remains constant. The optical signal emitted by the dual-wavelength laser 1111 is split by the first splitter 1121 into an optical signal with the wavelength λ1 and an optical signal with the wavelength λ2. The first optical modulator 1122 loads a modulation signal onto the optical signal with the wavelength λ2 to output modulated signal light with the wavelength λ2(S). The optical signal with the wavelength λ1 may be split into two parts by a power splitter. One part of the optical signal with the wavelength λ1 serves as an LO light λ1(LO) for coherent reception in the second direction, and the other part of the optical signal with the wavelength λ1 and the modulated signal light λ2(S) are combined into an optical signal (that is, the optical signal in the first direction) by the combiner 1123. The optical signal in the first direction is output after passing through the optical circulator 1131, and is sent to the second device 20 after entering the optical fiber link 30 for transmission and power distribution.

After the optical signal λ1(S) in the second direction (represented by the dashed arrow) reaches the first device 10 through the optical fiber link 30, the optical signal λ1(S) in the second direction is input into the first coherent receiver 12 through the optical circulator 1131. The optical signal λ1(S) in the second direction may be input into the first coherent receiver 12 together with the LO light λ1(LO) to realize the coherent reception of the optical signal in the second direction.

Figure 6:
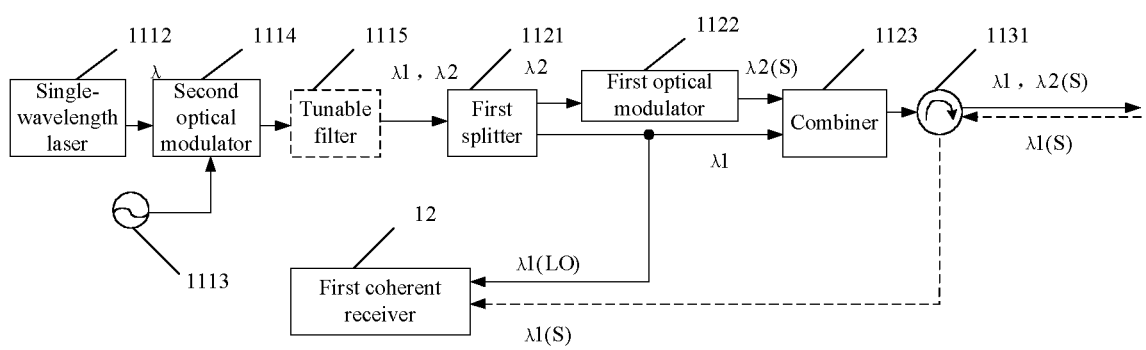
FIG. 6 is a schematic diagram of a first device according to another embodiment of the disclosure.

With reference to FIG. 6, in an embodiment, the first optical transmitter 111 includes a single-wavelength laser 1112, a radio frequency source 1113 and a second optical modulator 1114. The single-wavelength laser 1112 is connected with the second optical modulator 1114, and the second optical modulator 1114 is connected with the radio frequency source 1113 and the modulation and splitting subunit 112 respectively.

The single-wavelength laser 1112 is configured to generate a single-wavelength optical signal and send the single-wavelength optical signal to the second optical modulator 1114.

The second optical modulator 1114 is configured to modulate the single-wavelength optical signal under the drive of the radio frequency source 1113 to generate the optical signal to be modulated, and send the optical signal to be modulated to the modulation and splitting subunit 112.

In the present embodiment, the first optical transmitter 111 is based on a common single-wavelength laser. The single-wavelength laser 1112 may be realized by using, but not limited to, a common DFB laser, an External Cavity Laser (ECL), and a Fabry-Perot (FP) laser.

The second optical modulator 1114 mainly realizes a function of generating multiple wavelengths under the drive of a radio frequency signal. The second optical modulator 1114 may be realized through, but not limited to, an intensity modulator, a phase modulator, or an In-phase Quadrature (IQ) modulator. In practical application, the number and interval of generated wavelengths may be adjusted by changing the frequency and waveform of the radio frequency signal, an offset point of the second optical modulator 1114, a driving voltage or other factors, so as to obtain different frequency components.

If two or more than two wavelengths are generated by the second optical modulator 1114, a tunable filter 1115 may be used to obtain the two wavelengths λ1 and λ2. With reference to FIG. 6, in another embodiment, the first optical transmitter 111 includes a single-wavelength laser 1112, a radio frequency source 1113, a second optical modulator 1114 and a tunable filter 1115. The single-wavelength laser 1112 is connected with the second optical modulator 1114, the second optical modulator 1114 is connected with the radio frequency source 1113 and the tunable filter 1115 respectively, and the tunable filter 1115 is connected with the modulation and splitting subunit 112.

The single-wavelength laser 1112 is configured to generate a single-wavelength optical signal and send the single-wavelength optical signal to the second optical modulator 1114.

The second optical modulator 1114 is configured to modulate the single-wavelength optical signal under the drive of the radio frequency source 1113 to generate the optical signal with the two or more than two wavelengths including the direct current optical signal with the first wavelength and the direct current optical signal with the second wavelength.

The tunable filter 1115 is configured to filter the optical signal with the two or more than two wavelengths to obtain the optical signal to be modulated, and send the optical signal to be modulated to the modulation and splitting subunit 1112.

With reference to FIG. 6, the operating process of the coherent detection implementation device is described below. The single-wavelength laser 1112 emits an optical signal with the wavelength λ to be input into the second optical modulator 1114. The second optical modulator 1114 generates, under the drive of the radio frequency signal, an optical signal including two wavelengths λ1 and λ2 with a known frequency difference (or the second optical modulator 1114 generates, under the drive of the radio frequency signal, an optical signal with multiple (more than or equal to two) wavelengths, and then the optical signal including two wavelengths λ1 and λ2 with a known frequency difference is obtained through the tunable filter 1115). Then the optical signal is split by the first splitter 1121 into two optical signals with the wavelengths λ1 and λ2. The first optical modulator 1122 loads a modulation signal onto the optical signal with the wavelength λ2 to output the modulated signal light with the wavelength λ2(S). The optical signal with the wavelength λ1 may be split into two parts by a power splitter. One part of the optical signal with the wavelength λ1 serves as an LO light for coherent reception λ1(LO) in the second direction, and the other part of the optical signal with the wavelength λ1 and the modulated signal light λ2(S) are combined into an optical signal (that is, the optical signal in the first direction) by the combiner 1123. The optical signal in the first direction is output after passing through the optical circulator 1131, and is sent to the second device 20 after entering the optical fiber link 30 for transmission and power distribution.

After the optical signal λ1(S) in the second direction reaches the first device 10 through the optical fiber link 30, the optical signal λ1(S) in the second direction is input into the first coherent receiver 12 through the optical circulator 1131. The optical signal λ1(S) in the second direction may be input into the first coherent receiver 12 together with the LO light λ1(LO) to realize the coherent reception of the optical signal in the second direction.

Figure 7:
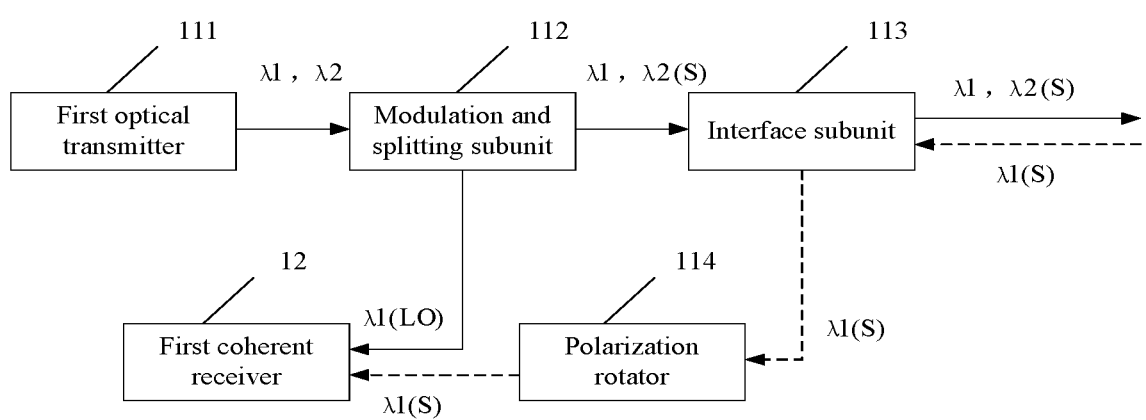
FIG. 7 is a schematic diagram of a first device according to yet another embodiment of the disclosure.

As shown in FIG. 7, in an embodiment, the first transceiver unit 11 may further include a polarization rotator 114.

The polarization rotator 114 is respectively connected with the first coherent receiver 12 and the interface subunit 113, and is configured to perform polarization conversion on the optical signal in the second direction, and send the optical signal in the second direction to the first coherent receiver 12.

When the optical signal in the second direction is polarized at the second device, polarization conversion may be performed to the received optical signal in the second direction through the polarization rotator 114, so that polarization states of the LO light and the optical signal in the second direction are made the same.

In another embodiment, when the optical signal in the second direction is polarized at the second device, the first device 10 does not polarize the received optical signal in the second direction, but polarizes the LO light instead, which may also make the polarization states of the LO light and the optical signal in the second direction the same. In the present embodiment, the polarization rotator 114 is between the modulation and splitting subunit 112 and the first coherent receiver 12, and is configured to polarize the LO light output by the modulation and splitting subunit 112.

With reference to FIG. 3, FIG. 5, FIG. 6 and FIG. 7, the first coherent receiver 12 may realize the coherent reception of the optical signal in the second direction, so as to improve the reception sensitivity of the second direction. Because the polarization state of the optical signal in the second direction may change after the optical signal in the second direction passes through the optical fiber link 30 (for example, the ODN) and the optical circulator, the first coherent receiver 12 may respectively receive two polarization state components of the optical signal in the second direction based on a polarization diversity structure commonly used in the field of optical communications. Because the LO light for coherent reception at the first device 10 is generated from the laser in the first optical transmitter 111, the expensive LO laser is saved, which reduces the cost of the device. In addition, because the wavelength of both the signal light and the LO light is 2\1, it is easier to achieve zero difference reception, and the complexity of DSP algorithm is reduced, the system is simple and easy to be realized.

The first coherent receiver 12 may also be based on the structure of other coherent receivers that are not sensitive to the polarization of the signal light and the LO light. Taking coherent reception of an intensity modulated signal as an example, with reference to FIG. 8, in an embodiment, the first coherent receiver 12 includes: a first optical coupler 121, a polarization splitter 122, a first photoelectric detector 123, a second photoelectric detector 124 and a signal processing module 125. The polarization splitter 122 is respectively connected with the first optical coupler 121, the first photoelectric detector 123 and the second photoelectric detector 124. The signal processing module 125 is respectively connected with the first photoelectric detector 123 and the second photoelectric detector 124.

The first optical coupler 121 is configured to perform coherent frequency mixing between the LO light and the optical signal in the second direction to generate a frequency mixed optical signal. The polarization splitter 122 is configured to split the frequency mixed optical signal into polarization optical signals in two directions, send the polarization optical signal in X direction to the first photoelectric detector 123, and send the polarization optical signal in Y direction to the second photoelectric detector 124. The first photoelectric detector 123 is configured to convert the polarization optical signal in the X direction into a first electrical signal, and send the first electrical signal to the signal processing module 125. The second photoelectric detector 124 is configured to convert the polarization optical signal in the Y direction into a second electrical signal, and send the second electrical signal to the signal processing module 125. The signal processing module 125 is configured to perform Digital Signal Processing (DSP) to the first electrical signal and the second electrical signal to demodulate the optical signal in the second direction.

Figure 8:
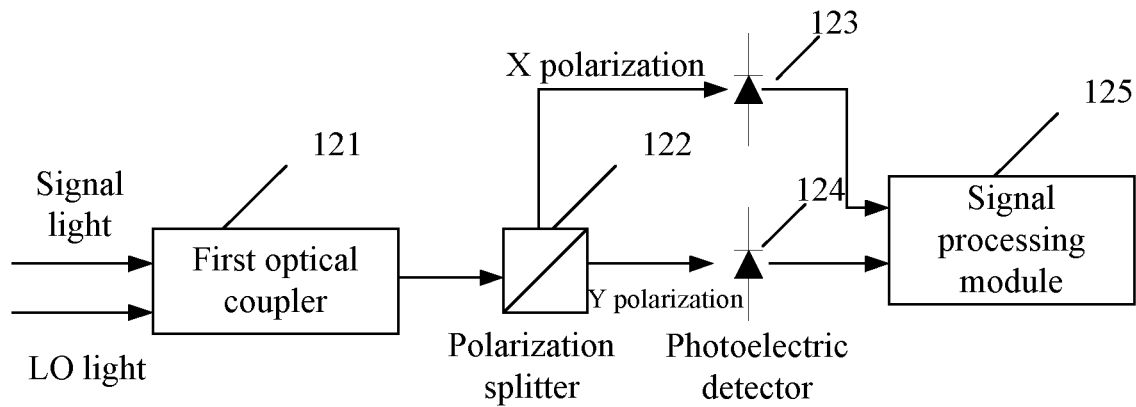
FIG. 8 is a schematic diagram of a first coherent receiver according to an embodiment of the disclosure.

In the present embodiment, compared with the coherent receiver of polarization diversity, the first coherent receiver 12 which is polarization-insensitive may realize polarization-insensitive reception of the intensity modulated signal by using several simple components shown in FIG. 8. The first optical coupler 121 performs frequency mixing to the signal light and the LO light, which may be realized by using, but not limited to, a 3dB coupler. The signal processing module 125 may perform square rate detection, filtering and addition to two electrical signals that are output by the first photoelectric detector 123 and the second photoelectric detector 124 respectively, so as to realize demodulation of the modulated signal. The signal processing module 125 may be implemented based on, but not limited to, signal processing in an analog domain, or based on a simple DSP algorithm. The first coherent receiver 12 adopts the structure of polarization-insensitive coherent receiver, and may realize correct coherent reception and demodulation of the optical signal in the second direction without using the polarization diversity structure and complex DSP algorithm, which greatly reduces the complexity of the component and further reduces the cost of device.

Figure 9:
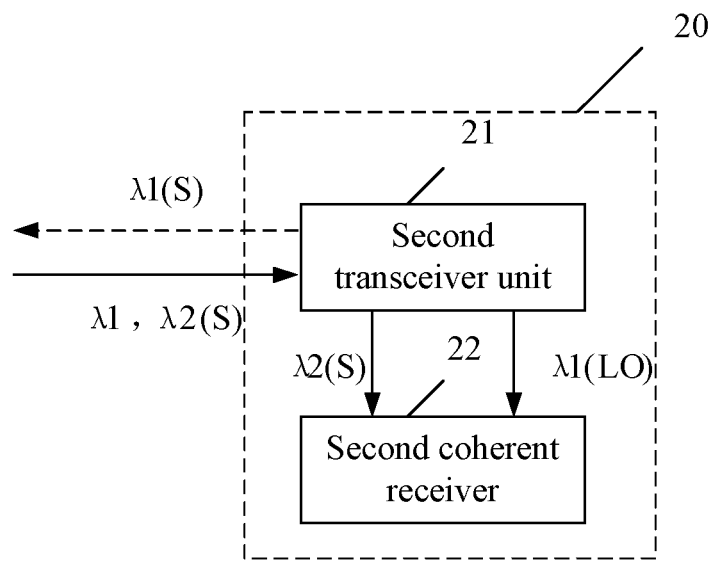
FIG. 9 is a schematic diagram of a coherent detection implementing apparatus (applied to a second device) according to an embodiment of the disclosure.

For the second device 20, as shown in FIG. 9, a coherent detection implementing apparatus that is in the second device 20 includes: a second transceiver unit 21 and a second coherent receiver 22. The second transceiver unit 21 is configured to receive an optical signal in a first direction from the first device 10, wherein the optical signal in the first direction includes a direct current optical signal with a first wavelength and a modulated optical signal with a second wavelength. The second coherent receiver 22 is connected with the second transceiver unit 21, and is configured to take a part of the direct current optical signal with the first wavelength as an LO light for coherent reception, perform coherent frequency mixing between the LO light and the modulated optical signal with the second wavelength, and demodulate the modulated optical signal with the second wavelength.

In the embodiments of the disclosure, the cost and complexity of coherent detection are reduced by saving an LO laser used for coherent reception.

In an embodiment, the second transceiver unit 21 is further configured to modulate the other part of the direct current optical signal with the first wavelength to generate a modulated optical signal with the first wavelength, and send the modulated optical signal with the first wavelength to the first device 10 as the optical signal in the second direction.

In the embodiments of the disclosure, there is no need to configure an additional laser used for emitting the optical signal in the second direction, which greatly reduces the cost of the system.

Figure 10:
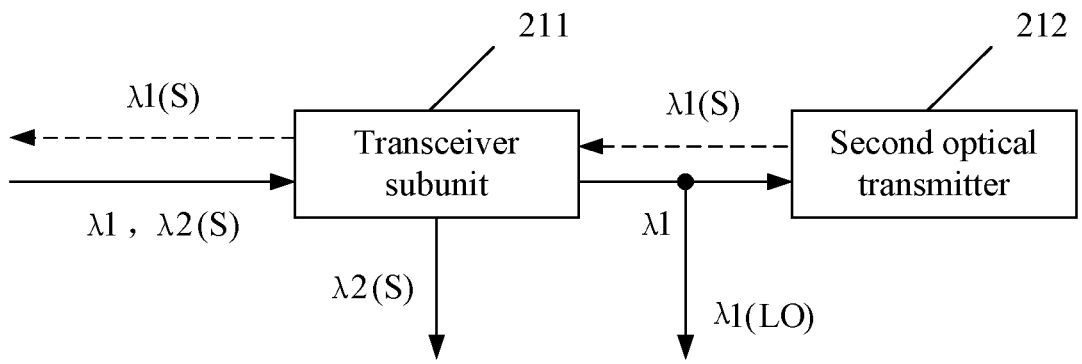
FIG. 10 is a schematic diagram of a second transceiver unit according to an embodiment of the disclosure.

As shown in FIG. 10, in an embodiment, the second transceiver unit 21 includes: a transceiver subunit 211 and a second optical transmitter 212 that are connected. The transceiver subunit 211 is configured to receive the optical signal in the first direction from the first device 10, send a part of the direct current optical signal with the first wavelength to the second coherent receiver 22, send the other part of the direct current optical signal with the first wavelength to the second optical transmitter 212, receive the modulated optical signal with the first wavelength sent by the second optical transmitter 211, and send the modulated optical signal with the first wavelength to the first device 10. The second optical transmitter 212 is configured to modulate the other part of the direct current optical signal with the first wavelength to generate the modulated optical signal with the first wavelength.

Figure 11:
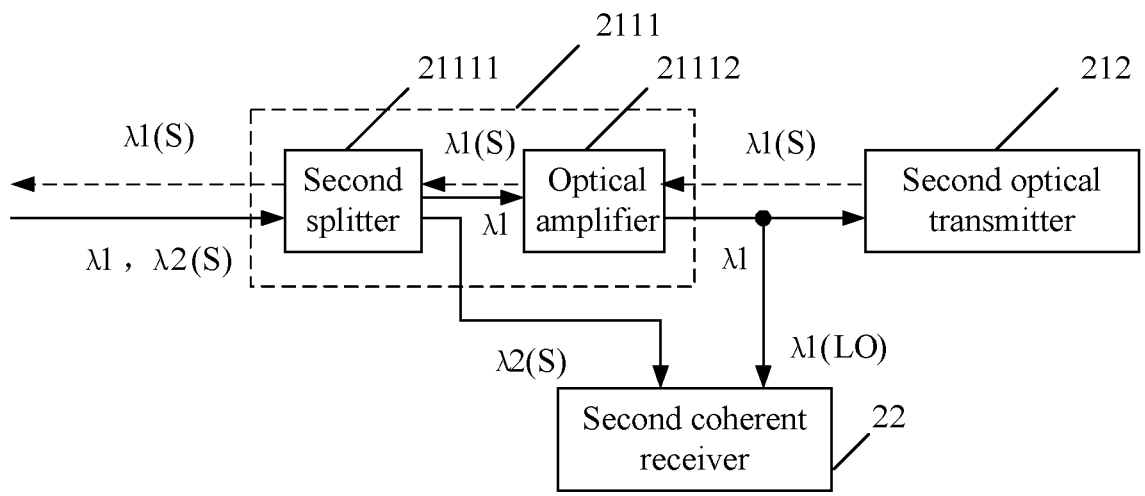
FIG. 11 is a schematic diagram of a second device according to an embodiment of the disclosure.

Reference to FIG. 11, in an embodiment, the transceiver subunit 211 includes a signal splitting and amplification module 2111. The signal splitting and amplification module 2111 includes a second splitter 21111 and an optical amplifier 21112 that are connected. The second splitter 21111 is configured to split the optical signal in the first direction into two beams, one of which is the direct current optical signal with the first wavelength and the other of which is the modulated optical signal with the second wavelength, send the direct current optical signal with the first wavelength to the optical amplifier 21112, and send the modulated optical signal with the second wavelength to the second coherent receiver 22. The optical amplifier 21112 is configured to perform power amplification to the direct current optical signal with the first wavelength, send a part of the direct current optical signal with the first wavelength to the second coherent receiver 22 as the LO light for coherent reception, and output the other part of the direct current optical signal with the first wavelength to the second optical transmitter 212.

Figure 12:
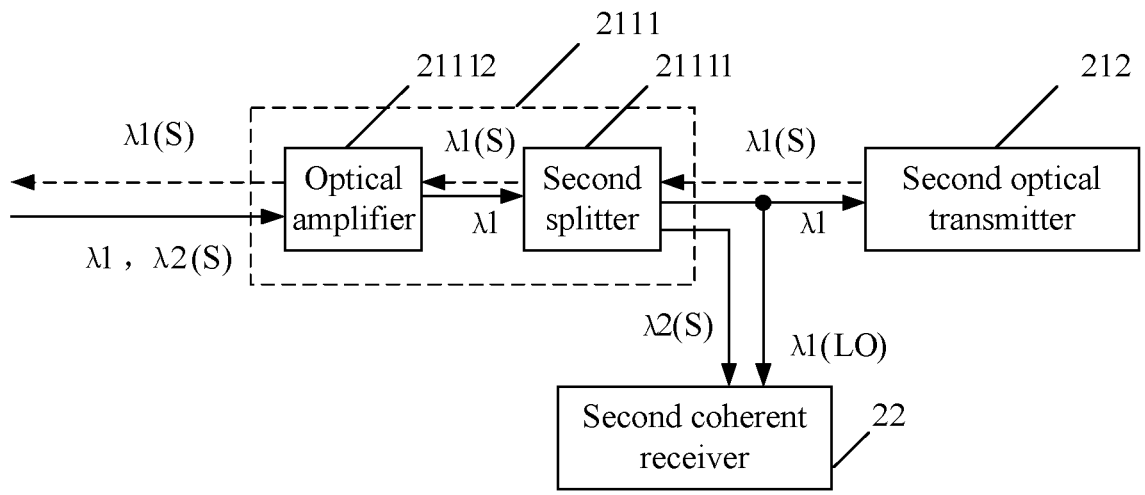
FIG. 12 is a schematic diagram of a second device according to another embodiment of the disclosure.

With reference to FIG. 12, in another embodiment, the positions of the second splitter 21111 and the optical amplifier 21112 in the transceiver subunit 211 may be exchanged. In such a case, the optical signal in the second direction is first amplified and then split. The optical amplifier 21112 is configured to perform power amplification to the optical signal in the first direction, and output the amplified optical signal in the first direction to the second splitter 21111. The second splitter 21111 is configured to split the amplified optical signal in the first direction into two beams, one of which is the direct current optical signal with the first wavelength and the other of which is the modulated optical signal with the second wavelength, output a part of the direct current optical signal with the first wavelength to the second coherent receiver 22 as the LO light for coherent reception, output the other part of the direct current optical signal with the first wavelength to the second optical transmitter 212, and output the modulated optical signal with the second wavelength to the second coherent receiver 22.

In the embodiments of FIG. 11 and FIG. 12, after the signal splitting and amplification module 2111 performs power amplification to the modulated optical signal with the first wavelength generated by the second optical transmitter 212, the modulated optical signal with the first wavelength is output to the first device 10.

The second splitter 21111 may realize an optical demultiplexing function, and may be realized by, but not limited to, an AWG, a micro-ring resonator or other structures.

The optical amplifier 21112 may realize a function of power amplification of light, and may be realized by, but not limited to, a Semiconductor Optical amplifier (SOA) or an Erbium Doped Fiber Amplifier (EDFA).

With reference to FIG. 11, the working process for the second device 20 is described below. After the optical signal in the first direction (represented by the solid arrow) transmitted and distributed through the optical fiber link 30 reaches a certain second device, two optical signals with the wavelengths $\lambda 1$ and $\lambda 2$ are separated through the second splitter 21111. The optical signal with the wavelength $\lambda 2(S)$ is input into the second coherent receiver 22. After the power of the optical signal with the wavelength $\lambda 1$ is amplified by the optical amplifier 21112, the optical signal with the wavelength $\lambda 1$ is divided into two parts by the power splitter. One part, serving as the LO light $\lambda 1(LO)$, is input into the second coherent receiver 22 along with the second wavelength optical signal $\lambda 2(S)$ to realize the coherent reception of the optical signal in the first direction. The other part of the amplified $\lambda 1$ signal is input into the second optical transmitter 212. After loading the modulation signal to the $\lambda 1$, a $\lambda 1(S)$ signal light is output into the optical amplifier 21112 (represented by the dashed arrow). The $\lambda 1(S)$, the power of which is amplified in the optical amplifier 21112, is input into the optical fiber link 30 through the second splitter 21111, so as to achieve the sending and transmission of the optical signal in the second direction.

With reference to FIG. 12 for the second device 20 is described below. The first optical signal transmitted and distributed through the optical fiber link 30 first passes through the optical amplifier 21112, and power amplification is performed to both $\lambda 1$ and $\lambda 2(S)$. After that, two optical signals with the wavelengths $\lambda$ and $\lambda 2$ are separated through the second splitter 21111. The optical signal with the wavelength $\lambda 2(S)$ is input into the second coherent receiver 22. The optical signal with the wavelength $\lambda 1$ is divided into two parts by the power splitter. One part, serving as the LO light, is input into the second coherent receiver 22 along with $\lambda 2(S)$ to realize the coherent reception of the optical signal in the first direction. The other part of the amplified 21 signal is input into the second optical transmitter 212. After loading the modulation signal to the $\lambda 1$, a $\lambda 1(S)$ signal light is input into the optical amplifier 21112 through the second splitter 21111. The $\lambda 1(S)$, the power of which is amplified in the optical amplifier 21112, is input into the optical fiber link 30, so as to achieve the sending and transmission of the optical signal in the second direction.

Figure 13:
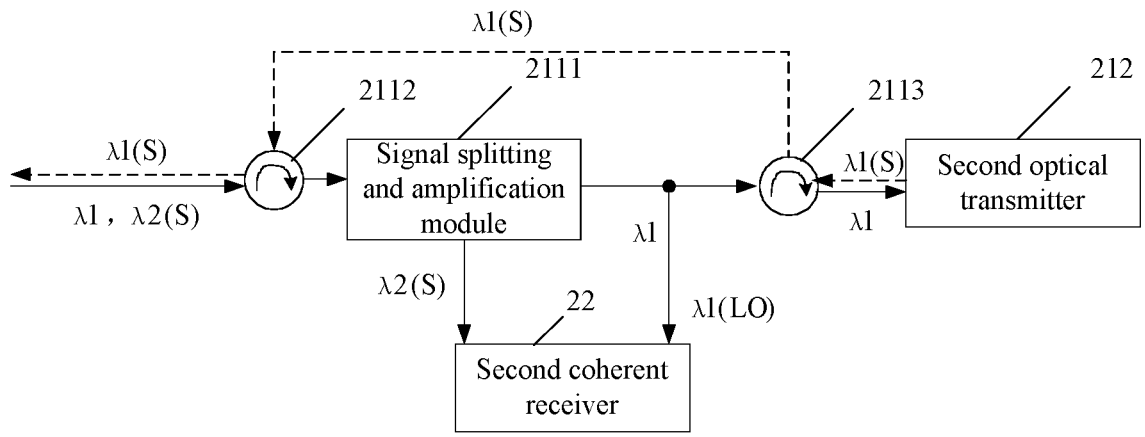
FIG. 13 is a schematic diagram of a second device according to yet another embodiment of the disclosure.

As shown in FIG. 13, in an embodiment, the transceiver subunit 211 may further include: a first interface module 2112 and a second interface module 2113. The first interface module 2112 is configured to output the optical signal in the first direction to the signal splitting and amplification module 2111, and send the modulated optical signal with the first wavelength to the first device 10 as the optical signal in the second direction. The second interface module 2113 is configured to output the direct current optical signal with the first wavelength output by the signal splitting and amplification module 2111 to the second optical transmitter 212, and output the modulated optical signal with the first wavelength output by the second optical transmitter 212 to the first interface module 2112.

In an embodiment, both the first interface module 2112 and the second interface module 2113 include the optical circulator.

The difference between FIG. 12 and FIG. 13 is that the modulated signal λ1(S) output by the second optical transmitter 212 in FIG. 13 is not amplified by an additional optical amplifier, and the modulated signal λ1(S) may be input into the optical fiber link 30 through two optical circulators to achieve the sending and transmission of the optical signal in the second direction.

Figure 14A:
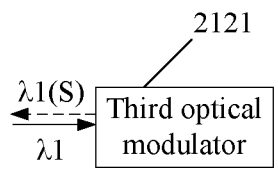
FIGS. 14(*a*) to (*c*) are schematic diagrams of a second optical transmitter according to an embodiment of the disclosure.

With reference to FIG. 14(a), the second optical transmitter 212 includes a third optical modulator 2121, which may be a reflective optical modulator.

The reflective optical modulator may realize functions of modulating the optical signal with the first wavelength and reflecting the modulated optical signal with the first wavelength back to the same input optical fiber. The reflective optical modulator may be realized by, but not limited to, an EA modulator with a high reflectivity coating or other reflector structures. In the implementation of the reflective optical modulator, different optical modulators are selected according to modulation formats required by the system. An SOA may also be integrated in the reflective optical modulator to amplify the modulated signal. The use of the reflective optical modulator may save the laser used for emitting the optical signal in the second direction at the second device, thereby reducing the cost of device at the second device.

Figure 14B:
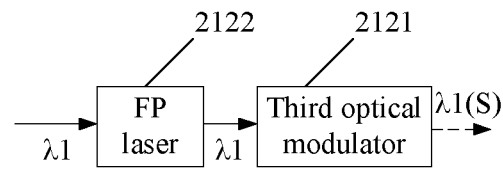

With reference to FIG. 14(b), in an embodiment, the second optical transmitter 212 may also include an FP laser 2122. The FP laser 2122 is an injection-locked laser, which is configured to perform regenerative amplification to an input optical signal according to a frequency of the input direct current optical signal with the first wavelength.

The third optical modulator 2121 is respectively connected with the FP laser 2122 and the transceiver subunit 211, and is configured to modulate the amplified direct current optical signal with the first wavelength and output the modulated optical signal with the first wavelength.

In the present embodiment, the light generated by the injection-locked FP laser is modulated by the third modulator 2121 into the modulated optical signal with the first wavelength λ1(S).

In the present embodiment, the third optical modulator 2121 may be realized by using, but not limited to, the EA modulator, the MZ modulator, the micro-ring resonator, etc. In practical implementation of the third optical modulator 2121, different optical modulators may be selected according to modulation formats required by the system.

The embodiment shown in FIG. 14(b) is more suitable for use in combination with the embodiment shown in FIG. 12.

Figure 14C:
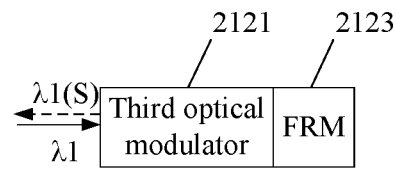

With reference to FIG. 14(c), based on the embodiment shown in FIG. 14(a), the second optical transmitter 212 may further include a Faraday Rotator Mirror (FRM) 2123.

The FRM 2123 is connected with the third optical modulator 2121, and is configured to polarize the modulated optical signal with the first wavelength output by the third optical modulator 2121, and output the polarized modulated optical signal with the first wavelength to the third optical modulator 2121.

In the present embodiment, the FRM 2123 is integrated following the reflective optical modulator. By virtue of the effect of the FRM, after the first Faraday rotation, the polarization state of the optical signal rotates 45°, and after the reflection of the mirror and the second Faraday rotation, the polarization state may rotate 45° in the same direction again. Therefore, there will be a 90° rotation between the polarization state of the optical signal input into the FRM and the polarization state of the optical signal output from the FRM.

The second device 20 in the embodiment shown in FIG. 14(c) is used in combination with the first device 10 in the embodiment shown in FIG. 7.

With reference to FIG. 9, the second coherent receiver 22 can realize the coherent reception of the optical signal in the first direction, so as to improve the reception sensitivity in the first direction. Because the signal light and the LO light input into the second coherent receiver 22 originate from the same source and are transmitted through the same optical fiber, the polarization states of the signal light and the LO light are consistent. Therefore, the correct coherent reception and demodulation of the optical signal in the first direction can be realized without using the polarization diversity structure, thereby reducing the complexity of component by half.

Figure 15:
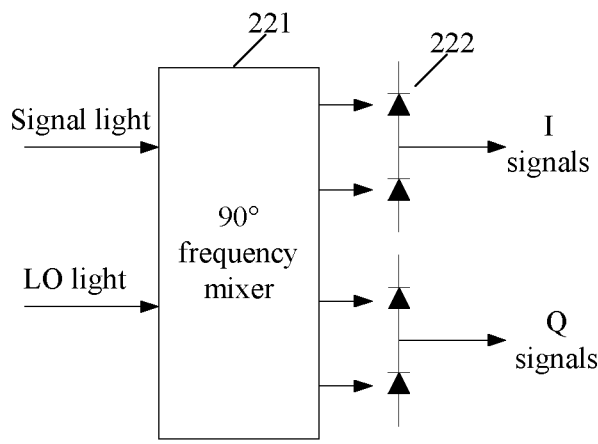
FIG. 15 is a schematic diagram of a second coherent receiver according to an embodiment of the disclosure.

If the optical signal in the first direction is modulated by Quadrature Phase Shift Keying (QPSK) (the optical signal is not limited to be modulated according to this modulating format), then the second coherent receiver 22 may adopt the structure shown in FIG. 15. The structure includes a 90 degree frequency mixer (90° frequency mixer) 221 and two pairs of balance detectors 222. The 90° frequency mixer 221 is configured to perform coherent frequency mixing between the LO light and the modulated optical signal with the second wavelength, and output the signal obtained by the coherent frequency mixing to the two pairs of balance detectors 222 respectively. The two pairs of balance detectors 222 are configured to demodulate the signal obtained by the coherent frequency mixing. Compared with the polarization diversity structure, the second coherent receiver 22 only needs to perform mixing and detection in one polarization direction, thereby saving a half of the components and reducing the complexity and cost of the second device. In addition, because there are a known frequency difference and a constant phase difference between λ1 and λ2, the complexity of the DSP algorithm after coherent reception may be simplified, and the system is simple and easy to be realized.

Figure 16:
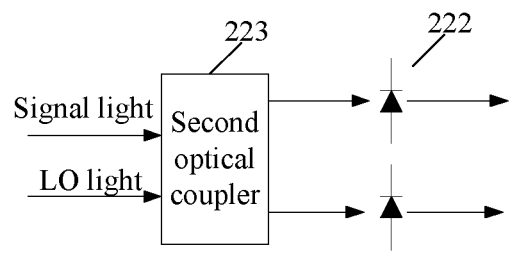
FIG. 16 is a schematic diagram of a second coherent receiver according to another embodiment of the disclosure.

With reference to FIG. 16, if amplitude modulation is used directly, the structure of the second coherent receiver 22 may be further simplified. For example, correct coherent reception and demodulation may be realized by using only a 2×2 coupler and a pair of balance detectors. In the present embodiment, the second coherent receiver 22 includes: a second optical coupler 223 and a pair of balance detectors 222. The second optical coupler 223 is configured to perform coherent frequency mixing between the LO light and the modulated optical signal with the second wavelength, and output the signal obtained by the coherent frequency mixing to the pair of balance detectors 222 respectively. The pair of balance detectors 222 is configured to respectively demodulate the signal obtained by the coherent frequency mixing.

In another embodiment, the second coherent receiver 22 may also adopt the polarization-insensitive or polarization diversity structure of the low cost coherent receiver provided in FIG. 8. In the present embodiment, the second coherent receiver 22 includes a first optical coupler 121, a polarization splitter 122, a first photoelectric detector 123, a second photoelectric detector 124 and a signal processing module 125. The polarization splitter 122 is respectively connected with the first optical coupler 121, the first photoelectric detector 123 and the second photoelectric detector 124. The signal processing module 125 is respectively connected with the first photoelectric detector 123 and the second photoelectric detector 124. The first optical coupler 121 is configured to perform coherent frequency mixing between the LO light and the modulated optical signal with the second wavelength to generate a frequency mixed optical signal. The polarization splitter 122 is configured to split the frequency mixed optical signal into polarization optical signals in two directions, send the polarization optical signal in X direction to the first photoelectric detector 123, and send the polarization optical signal in Y direction to the second photoelectric detector 124. The first photoelectric detector 123 is configured to convert the polarization optical signal in the X direction into a first electrical signal, and send the first electrical signal to the signal processing module 125. The second photoelectric detector 124 is configured to convert the polarization optical signal in the Y direction into a second electrical signal, and send the second electrical signal to the signal processing module 125. The signal processing module 125 is configured to perform DSP to the first electrical signal and the second electrical signal to demodulate the modulated second wavelength signal.

Because the LO light for coherent reception at the second coherent receiver 22 originates from the laser in the first device, the expensive LO laser is saved, which further reduces the cost of the second device.

With reference to FIG. 17, the technical solution of the embodiments of the disclosure will be described in detail by taking the application to a PON system as an example. The PON system includes: a local OLT device, a terminal ONU device, and an ODN.

The OLT device sends a downstream optical signal. The downstream optical signal includes two wavelengths. The optical signal with the wavelength λ2(S) is the modulated optical signal, while the optical signal with the wavelength λ1 is the direct current light. Before the downstream optical signal is output, the modulation and splitting subunit 112 in the OLT separates a part of the direct current light to be used as the LO light λ1(LO) for coherent reception at the OLT. The downstream optical signal reaches a certain ONU through an optical divider in the ODN, and the downstream modulated signal λ2(S) is obtained after filtering by the transceiver subunit 211. After the direct current light with the wavelength 21 is amplified by the optical amplifier in the transceiver subunit 211, a part of the optical power light is used as the LO light λ1(LO), and the LO light λ1(LO) is input, together with the modulated optical signal λ2(S), into the second coherent receiver 22 for coherent frequency mixing and photoelectric conversion, so as to realize the coherent reception of the downstream signal. The other part of the direct current light with the wavelength 21 enters the second optical transmitter 212 for modulation and reflection processing, so as to obtain an upstream modulated signal λ1(S). The upstream modulated signal λ1(S) then enters the ODU for transmission. After the upstream signal light λ1(S) reaches the OLT, the upstream signal light λ1(S), after passing through the interface subunit 113, is subjected to coherent frequency mixing with the LO light λ1(LO) output by the first optical transmitter 111 through the modulation and splitting subunit 112, so as to realize the coherent reception of the upstream signal.

On the premise of ensuring OLT output signals and ONU input signals in FIG. 10, the OLT as the first device in FIG. 3 to FIG. 8 and the ONU as the second device in FIG. 9 and FIG. 10 can be combined freely and work together with the ODN, so as to form a PON system for coherent reception.

In the PON system for coherent reception with low cost provided by the application example of the disclosure, the LO light for coherent reception of the upstream and downstream signals originates from the laser at the OLT, which avoids the use of expensive high-precision tunable lasers at the OLT and the ONU. In addition, the upstream modulated signal may be obtained by performing modulation, reflection, amplification and other processing to a downstream direct current signal, thereby saving the laser used for emitting the upstream signal at the ONU, and greatly reducing the cost of the device at the ONU. Two wavelengths are used in the downstream direction, wherein the signal of one wavelength is modulated, while the direct current signal of the other wavelength may directly serve as the LO light after passing the optical amplifier. Compared with the upstream and downstream scheme adopting a single wavelength, the scheme in the embodiments can avoid the use of a complex device for erasing modulation data. In addition, because the signal light and the LO light input into the coherent receiver at the ONU originate from the same source and are transmitted through the same optical fiber, the polarization states of the signal light and the LO light are consistent. Therefore, the correct coherent reception and demodulation of the downstream optical signal may be realized without using the polarization diversity structure, thereby reducing the complexity of component by half. In addition, the two wavelengths in the downstream optical signal originate from the same laser, the frequency difference is constant and adjustable, there is no need to continuously adjust the wavelength of the LO light with the change of environment and temperature, which reduces the complexity of the system implementation and DSP algorithm and is conducive to realizing scale applications. In an upstream direction, because the LO light for coherent reception at the OLT originates from the laser at an emitting end, the expensive high-precision LO laser is saved, which reduces the cost of the device at the OLT. The coherent reception of the upstream signal may also adopt the simplified structure of the coherent receiver, thereby reducing the complexity and cost of the component. In addition, because the signal light and the LO light have the same wavelength, it is easier to achieve zero difference reception, and the complexity of DSP algorithm is reduced, the system is simple and easy to be realized.

With reference to FIG. 18 that is an architecture diagram of a PON system provided by application example of the disclosure. The PON system includes: a local OLT device, a terminal ONU device, and an ODN.

The OLT device sends the downstream optical signal. The downstream optical signal includes two wavelengths. One wavelength λ2(S) is the modulated optical signal, while the other wavelength λ1 is the direct current light. Before the downstream optical signal is output, the modulation and splitting subunit 112 in the OLT separates a part of the direct current light to be used as the LO light λ1(LO) for coherent reception at the OLT. The downstream optical signal reaches a certain ONU through an optical divider in the ODN, and the downlink modulation signal λ2(S) is obtained after filtering by the transceiver subunit 211. After the direct current light with the wavelength λ1 is amplified by the optical amplifier in the transceiver subunit 211, a part of the optical power light is used as the LO light λ1(LO), and the LO light λ1(LO) is input, together with the modulated optical signal λ2(S), into the second coherent receiver 22 for coherent frequency mixing and photoelectric conversion, so as to realize the coherent reception of the downstream signal.

The other part of the direct current light with the wavelength λ1 enters the second optical transmitter 212 (including the third optical modulator 2121 and the FRM 2123) for modulation and reflection processing, so as to obtain the upstream modulated signal λ1(S). The upstream modulated signal λ1(S) then enters the ODU for transmission. After the upstream signal light λ1(S) reaches the OLT, the upstream signal light λ1(S), after passing through the interface subunit 113 and the polarization rotator 114, is subjected to coherent frequency mixing with the LO light λ1(LO) output by the first optical transmitter 111 through the modulation and splitting subunit 112, so as to realize the coherent reception of the upstream signal.

The second optical transmitter 212 in the ONU device of the application example adopts the form shown in FIG. 14(c), that is, an FRM is integrated behind the reflective optical modulator. By virtue of the effect of the FRM, after the first Faraday rotation, the polarization state of the optical signal rotates 45°, and after the reflection of the mirror and the second Faraday rotation, the polarization state may rotate 45° in the same direction again. Therefore, there will be a 90° rotation between the polarization state of the optical signal input into the FRM and the polarization state of the optical signal output from the FRM. From the perspective of the OLT end, the polarization state of λ1(LO) may deflect after λ1(LO) is transmitted through the optical fiber link and may rotate 90° after λ1(LO) passes through the FRM, and then λ1(LO) changes to λ1(S) after reflective modulation. After λ1(S) is transmitted through the same optical fiber link, the polarization rotation caused by the transmission in the optical fiber link may be canceled. Therefore, when the effect of the optical modulator on the polarization state is ignored, the polarization states of λ1(LO) and λ1(S) that are coherently received at the OLT end becomes nonrandom, and the polarization states of λ1(LO) and λ1(S) are perpendicular to each other. Therefore, the polarization rotator 114 at the OLT end may be used to perform polarized rotation to λ1(S) or λ1(LO) to ensure that the polarization states of λ1(S) and λ1(LO) entering the coherent receiver are the same. In this way, the first coherent receiver 12 at the OLT end can realize the correct coherent reception and demodulation of the upstream signal light without using the polarization diversity structure, which reduces the complexity of component by half, and further reduces the cost of the device at the OLT end. It is to be noted that if the device at the ONU end adopts a structure with the characteristic of the FRM, then the OLT end can choose the polarization rotator to cooperate with the ONU end for correct coherent reception.

For the first device end, as shown in FIG. 19, the coherent detection implementing method of the disclosure includes the following operations.

At S401, the first device sends an optical signal in a first direction to the second device, wherein the optical signal in the first direction includes a direct current optical signal with a first wavelength and a modulated optical signal with a second wavelength.

At S402, the first device receives an optical signal in a second direction from the second device, takes a part of the direct current optical signal with the first wavelength in the optical signal in the first direction as an LO light for coherent reception, performs coherent frequency mixing between the LO light and the optical signal in the second direction, and demodulates the optical signal in the second direction. The optical signal in the second direction includes a modulated optical signal with the first wavelength.

In the embodiments of the disclosure, the cost and complexity of coherent detection are reduced by saving an LO laser used for coherent reception.

Figure 20:
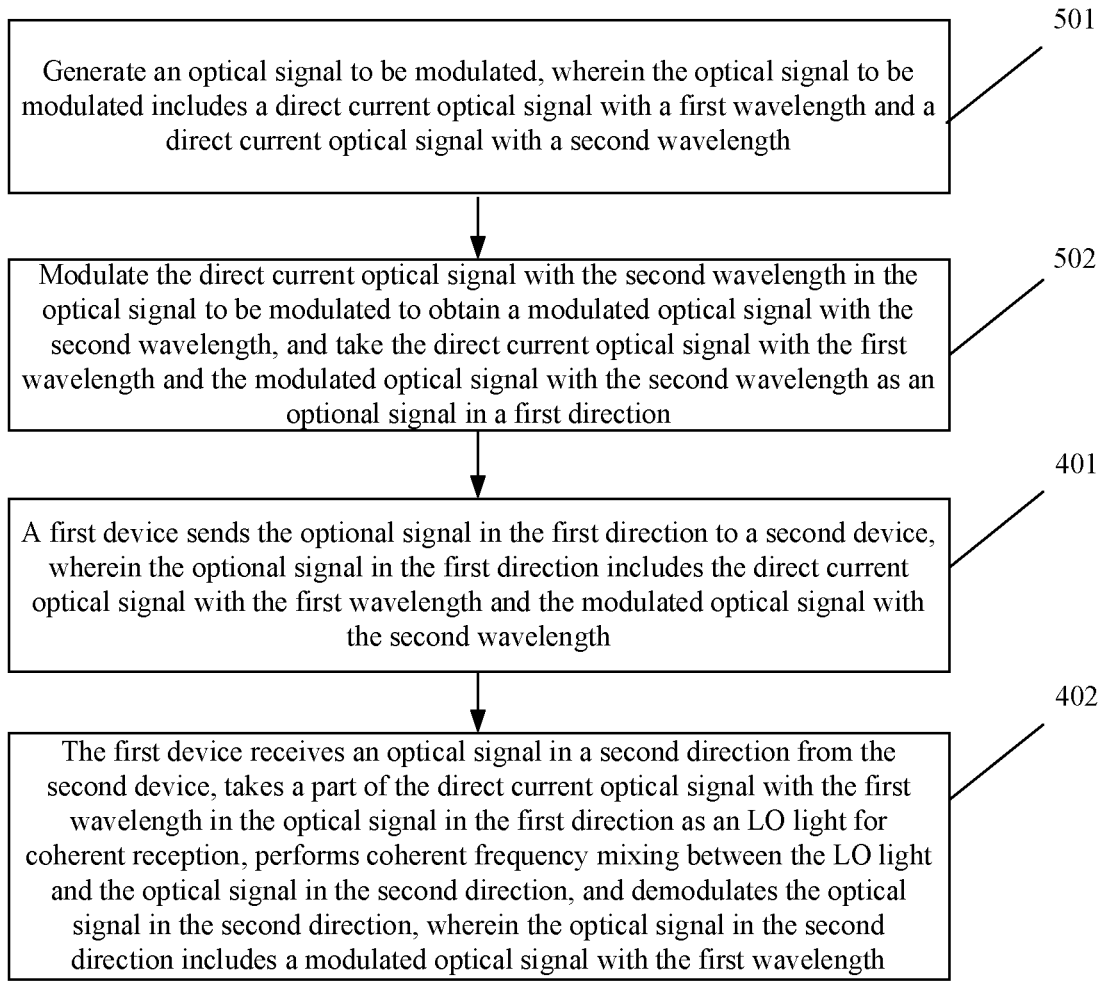
FIG. 20 is a flowchart of a coherent detection implementing method (applied to a first device) according to another embodiment of the disclosure.

As shown in FIG. 20, in an embodiment, before the first device sends the optical signal in the first direction to the second device, the method may further include the following operations. At S501, an optical signal to be modulated is generated, wherein the optical signal to be modulated includes the direct current optical signal with the first wavelength and the direct current optical signal with the second wavelength. At S502, the direct current optical signal with the second wavelength in the optical signal to be modulated is modulated to obtain the modulated optical signal with the second wavelength, and the direct current optical signal with the first wavelength and the modulated optical signal with the second wavelength are taken as the optical signal in the first direction.

In the embodiments of the disclosure, the optical signal in the second direction adopts optical signals of two wavelengths, one of which can be used for modulation while the other of which (the direct current light) can be directly used as the LO light. Compared with a single wavelength based upstream and downstream scheme, the scheme in the embodiments can avoid the use of a complex device for erasing modulation data.

In an embodiment, the optical signal to be modulated may be generated in the following manner: the optical signal to be modulated is generated directly; or a single-wavelength optical signal is generated, and then the optical signal to be modulated is generated based on the single-wavelength optical signal.

The optical signal to be modulated may be directly generated through the dual-wavelength laser; or the single-wavelength optical signal may be generated through the single-wavelength laser, and then the optical signal to be modulated is generated based on the single-wavelength optical signal.

The two wavelengths in the optical signal in the first direction originate from the same laser, thereby having constant and adjustable frequency difference. Therefore, there is no need to continuously adjust the wavelength of the LO light with the change of environment and temperature, which reduces the complexity of the system implementation and operation and is conducive to realizing scale applications.

In an embodiment, the optical signal to be modulated may be generated based on the single-wavelength optical signal in the following manner: the single-wavelength optical signal is modulated to generate the optical signal to be modulated; or the single-wavelength optical signal is modulated to generate an optical signal with two or more than two wavelengths including the direct current optical signal with the first wavelength and the direct current optical signal with the second wavelength, and the optical signal with the two or more than two wavelengths is filtered to obtain the optical signal to be modulated.

Because the single-wavelength laser is commonly used, the cost can be further reduced by using the single-wavelength laser.

Figure 21:
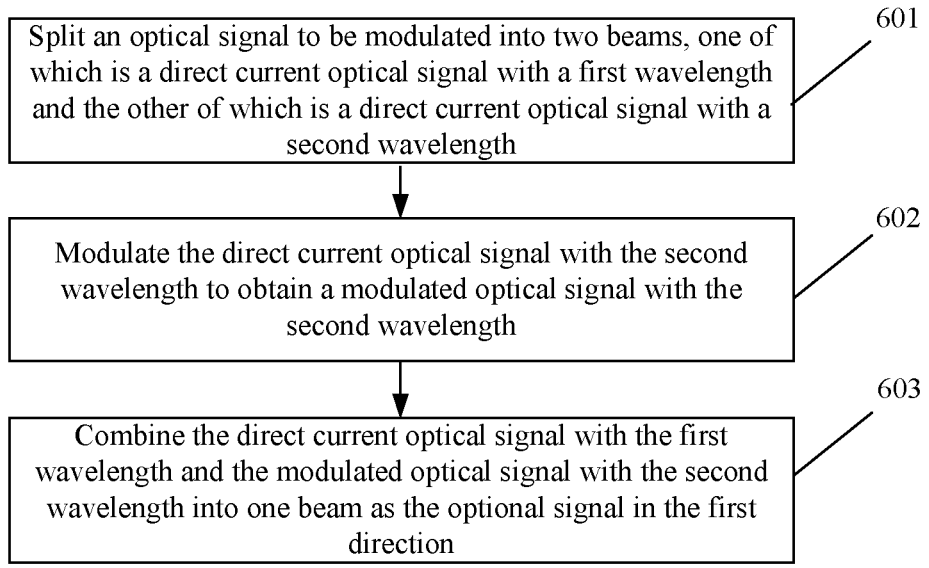
FIG. 21 is a schematic diagram of a subflow of a coherent detection implementing method shown in FIG. 19 and FIG. 20 according to another embodiment of the disclosure.

As shown in FIG. 21, in an embodiment, the operation that the direct current optical signal with the second wavelength in the optical signal to be modulated is modulated to obtain the modulated optical signal with the second wavelength, and the direct current optical signal with the first wavelength and the modulated optical signal with the second wavelength are taken as the optical signal in the first direction may include the following operations. At S601, the optical signal to be modulated is split into two beams, one of which is the direct current optical signal with the first wavelength and the other of which is the direct current optical signal with the second wavelength.

At S602, the direct current optical signal with the second wavelength is modulated to obtain the modulated optical signal with the second wavelength.

At S603, the direct current optical signal with the first wavelength and the modulated optical signal with the second wavelength are combined into one beam as the optical signal in the first direction.

The optical signal to be modulated may be split by the splitter into two beams. The direct current optical signal with the second wavelength may be modulated to obtain the modulated optical signal with the second wavelength by the optical modulator. The direct current optical signal with the first wavelength and the modulated optical signal with the second wavelength may be combined into one beam by the combiner.

Figure 22:
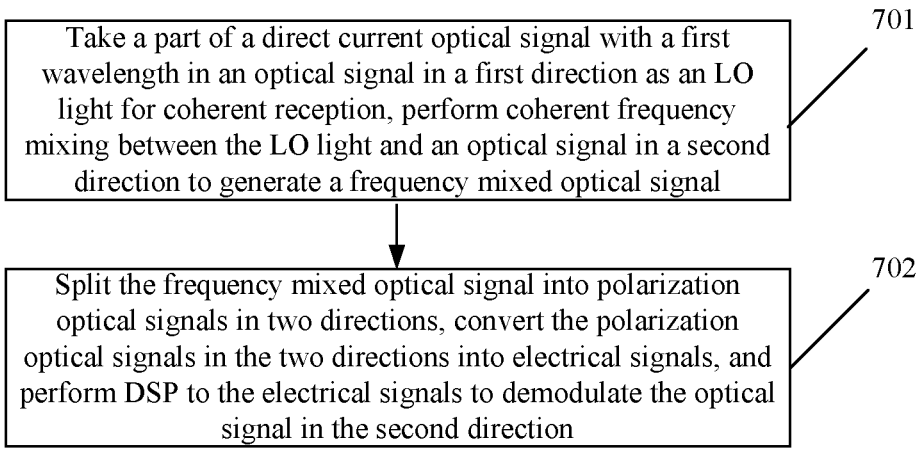
FIG. 22 is a schematic diagram of another subflow of a coherent detection implementing method shown in FIG. 19 and FIG. 20 according to another embodiment of the disclosure.

As shown in FIG. 22, in an embodiment, the operation that a part of the direct current optical signal with the first wavelength in the optical signal in the first direction is taken as the LO light for coherent reception, perform coherent frequency mixing between the LO light and the optical signal in the second direction, and the optical signal in the second direction is demodulated may include the following operations.

At S701, a part of the direct current optical signal with the first wavelength in the optical signal in the first direction is taken as the LO light for coherent reception, coherent frequency mixing is performed between the LO light and the optical signal in the second direction to generate a frequency mixed optical signal.

At S702, the frequency mixed optical signal is split into polarization optical signals in two directions, the polarization optical signals in the two directions are converted into electrical signals, and DSP is performed to the electrical signals to demodulate the optical signal in the second direction.

The coherent receiver may adopt the structure of polarization-insensitive coherent receiver, and may realize correct coherent reception and demodulation of the optical signal in the second direction without using the polarization diversity structure and the complex DSP algorithm, which greatly reduces the complexity of the component and further reduces the cost of device.

In an embodiment, when the optical signal in the second direction received by the first device is a polarized optical signal, before performing coherent frequency mixing between the LO light and the optical signal in the second direction, the method may further include that: the received optical signal in the second direction is polarized.

The polarization rotator may be used to polarize the received optical signal in the second direction, so that the polarization states of the LO light and the optical signal in the second direction entering the coherent receiver are the same, and thus the coherent receiver may realize the correct coherent reception and demodulation of the upstream signal light without using the structure of the polarization diversity coherent receiver. In this way, the solution can reduce the complexity of component by half, and further reduce the cost of the device at the OLT end.

Figure 23:
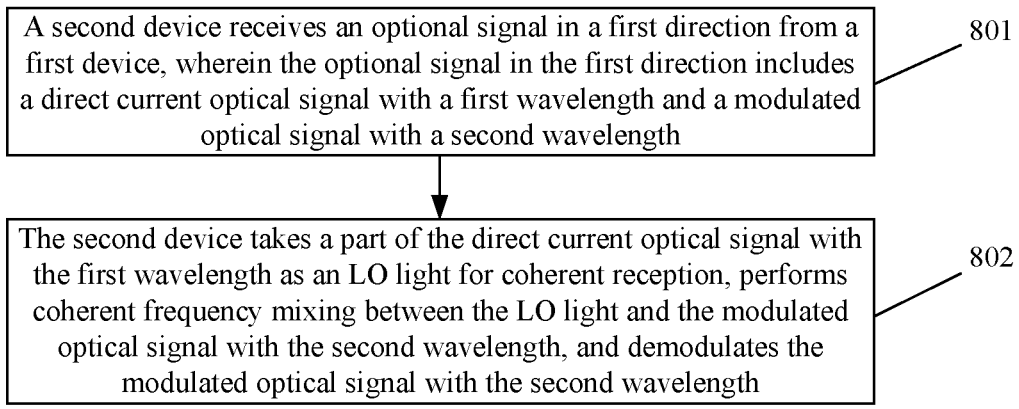
FIG. 23 is a flowchart of a coherent detection implementing method (applied to a second device) according to an embodiment of the disclosure.

For the second device, as shown in FIG. 23, the coherent detection implementing method of the disclosure includes the following operations.

At S801, the second device receives an optical signal in a first direction from the first device, wherein the optical signal in the first direction includes a direct current optical signal with a first wavelength and a modulated optical signal with a second wavelength.

At S802, the second device takes a part of the direct current optical signal with the first wavelength as an LO light for coherent reception, performs coherent frequency mixing between the LO light and the modulated optical signal with the second wavelength, and demodulates the modulated optical signal with the second wavelength.

In the embodiments of the disclosure, the cost and complexity of coherent detection are reduced by saving an LO laser used for coherent reception.

Figure 24:
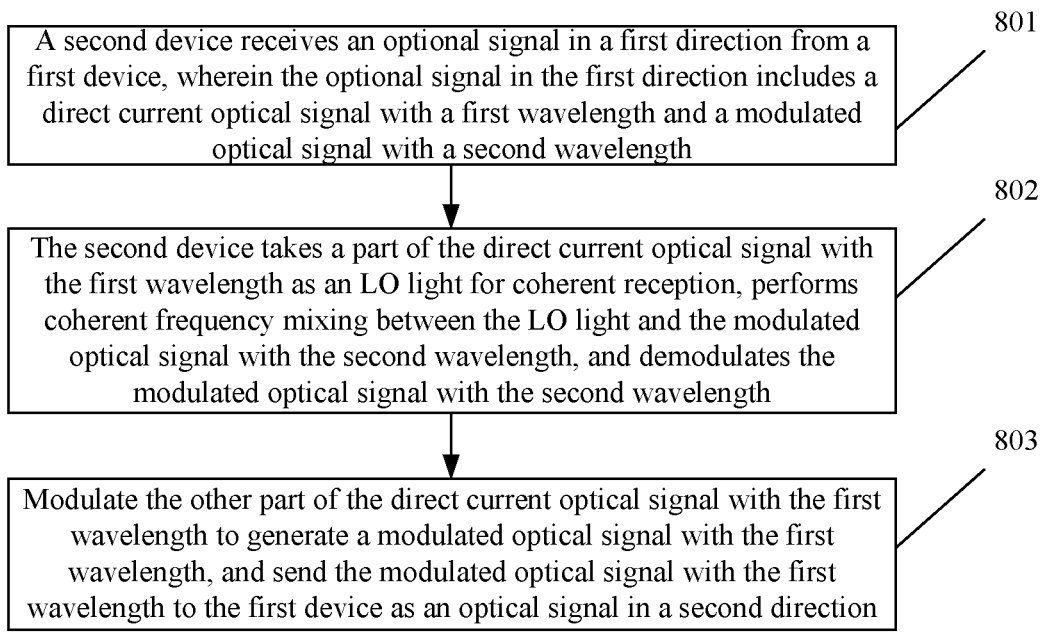
FIG. 24 is a flowchart of a coherent detection implementing method (applied to a second device) according to another embodiment of the disclosure.

As shown in FIG. 24, in an embodiment, the method may further include the following operations.

At S803, the other part of the direct current optical signal with the first wavelength is modulated to generate the modulated optical signal with the first wavelength, and the modulated optical signal with the first wavelength is sent to the first device as the optical signal in the second direction.

In the embodiments of the disclosure, there is no need to configure an additional laser used for emitting the optical signal in the second direction, which greatly reduces the cost of the system.

In an embodiment, before the second device takes a part of the direct current optical signal with the first wavelength as the LO light for coherent reception, the method may further include the following operation:

power amplification is performed to the optical signal in the first direction; or, the optical signal in the first direction is split into two beams, one of which is the direct current optical signal with the first wavelength and the other of which is the modulated optical signal with the second wavelength, and power amplification is performed to the direct current optical signal with the first wavelength.

The optical signal in the first direction may be first amplified, and then split by the splitter into the direct current optical signal with the first wavelength and the modulated optical signal with the second wavelength. Or, the optical signal in the first direction may be first split into two beams through the splitter, and then only the direct current optical signal with the first wavelength is amplified.

In an embodiment, before the other part of the direct current optical signal with the first wavelength is modulated to generate the modulated optical signal with the first wavelength, the method may further include the following operation:

regenerative amplification is performed to the other part of the direct current optical signal with the first wavelength.

The regenerative amplification may be performed to the other part of the direct current optical signal with the first wavelength through the injection-locked FP laser.

In an embodiment, the operation that the second device takes a part of the direct current optical signal with the first wavelength as the LO light for coherent reception, performs coherent frequency mixing between the LO light and the modulated optical signal with the second wavelength, and demodulates the modulated optical signal with the second wavelength may include that:

a part of the direct current optical signal with the first wavelength in the optical signal in the first direction is taken as the LO light for coherent reception, coherent frequency mixing is performed between the LO light and the modulated optical signal with the second wavelength to generate four or two frequency mixed optical signals; and the four or two frequency mixed optical signals are demodulated.

The signal light of the second device and the LO light originate from the same laser, and thus the polarization state of the LO light is consistent with that of the signal light. Therefore, the correct coherent reception and demodulation in the first direction can be realized without using the polarization diversity structure, thereby reducing the complexity and cost of the component. In addition, the coherent reception of the correlated signal light and LO light can effectively suppress the generation of phase noise, and the frequency difference is known and the phase difference is constant, so the back end of the coherent receiver has no need to adopt a complex DSP algorithm, the system structure is simple, and the cost is low.

In an embodiment, before the modulated optical signal with the first wavelength is sent to the first device as the optical signal in the second direction, the method may further include that: the modulated optical signal with the first wavelength is polarized.

The modulated optical signal with the first wavelength may be polarized by the FRM, so that the LO light entering the coherent receiver in the first device has the same polarization state as the optical signal in the second direction, thus the coherent receiver no longer needs to adopt the polarization diversity structure in coherent receiver.

Figure 25:
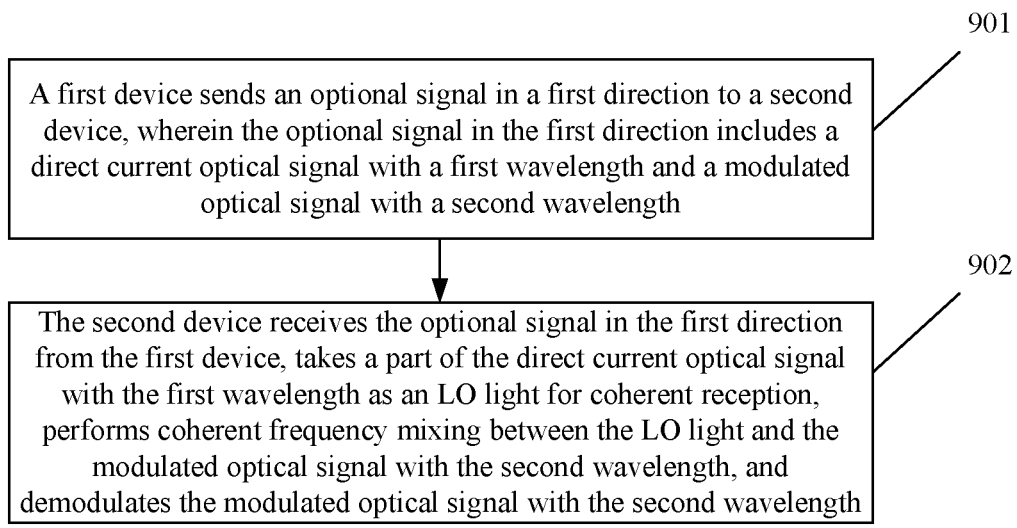
FIG. 25 is a flowchart of a coherent detection implementing method (applied to a coherent detection implementing system) according to an embodiment of the disclosure.

For the coherent detection implementing system, as shown in FIG. 25, the coherent detection implementing method of the disclosure includes the following operations. At S901, the first device sends an optical signal in a first direction to the second device, wherein the optical signal in the first direction includes a direct current optical signal with a first wavelength and a modulated optical signal with a second wavelength. At S902, the second device receives the optical signal in the first direction from the first device, takes a part of the direct current optical signal with the first wavelength as an LO light for coherent reception, performs coherent frequency mixing between the LO light and the modulated optical signal with the second wavelength, and demodulates the modulated optical signal with the second wavelength.

Figure 26:
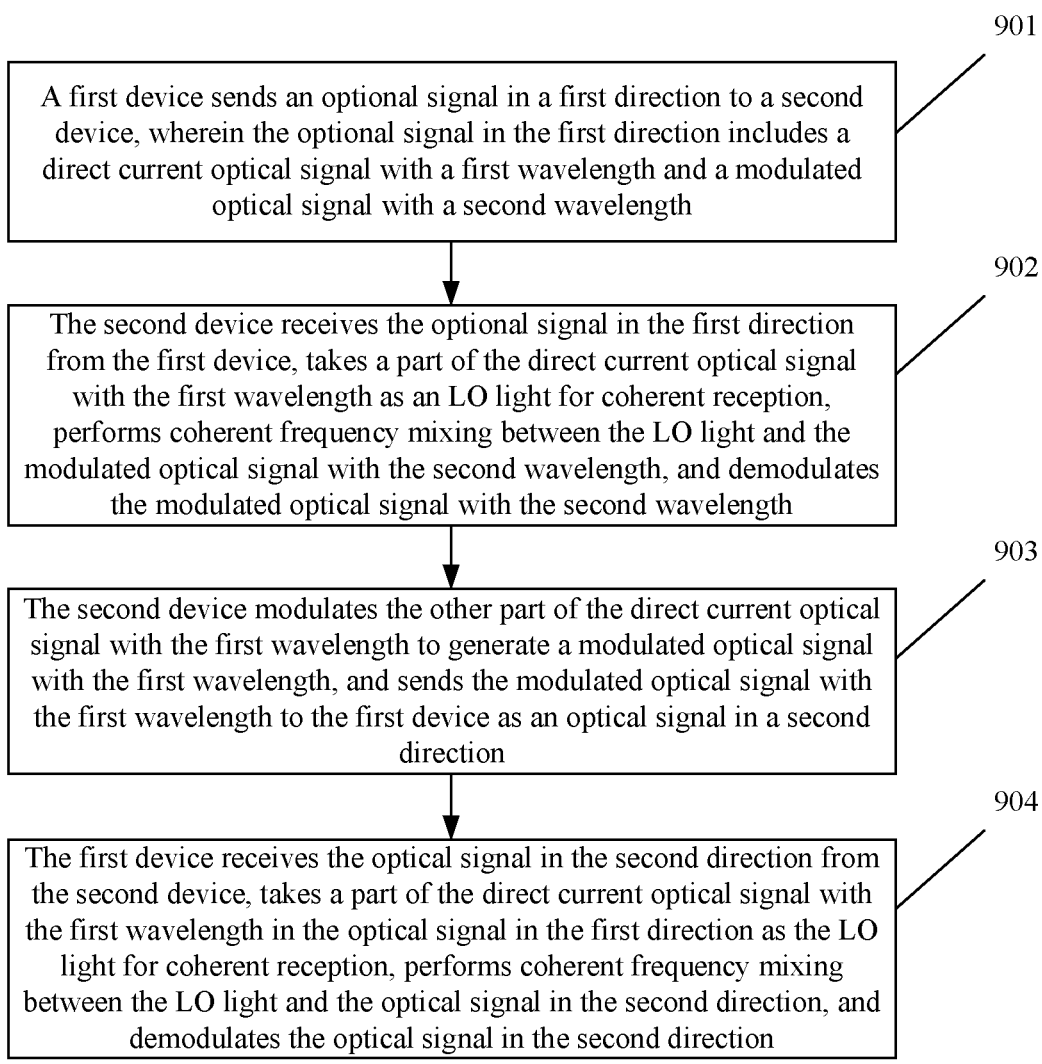
FIG. 26 is a flowchart of a coherent detection implementing method (applied to a coherent detection implementing system) according to another embodiment of the disclosure.

In an embodiment, as shown in FIG. 26, the method may further include the following operations.

At S903, the second device modulates the other part of the direct current optical signal with the first wavelength to generate a modulated optical signal with the first wavelength, and sends the modulated optical signal with the first wavelength to the first device as the optical signal in the second direction.

At S904, the first device receives the optical signal in the second direction from the second device, takes a part of the direct current optical signal with the first wavelength in the optical signal in the first direction as the LO light for coherent reception, performs coherent frequency mixing between the LO light and the optical signal in the second direction, and demodulates the optical signal in the second direction.

In the embodiments of the disclosure, the LO light for coherent reception in both directions originates from the laser at the first device end, which avoids the use of expensive high-precision tunable laser at both ends. Moreover, there is no need to configure an additional laser used for emitting the optical signal in the second direction, which greatly reduces the cost of the system.

For the coherent detection implementing system, the coherent detection implementing method of the disclosure may be implemented by referring to the above embodiments, which will not be repeated here.

Those having ordinary skill in the art may understand that all or some of the operations in the above method disclosed, the system, the functional modules/units in the device may be implemented as software, firmware, hardware or a proper combination of software, firmware and hardware. In an implementation of hardware, the division among the functional modules/units mentioned in the above description does not necessarily correspond to the division of physical units. For example, one physical component may have multiple functions, or a function or operation may be performed by several physical components in coordination. Some or all of the components may be implemented as software performed by a processor, for example, a digital signal processor or a microprocessor. Alternatively, some or all of the components may be implemented as hardware, or implemented as an integrated circuit, for example, an application-specific integrated circuit. Such software may be distributed on computer readable media. The computer readable media may include computer storage media (or non-transitory media) and communication media (or transitory media). It is commonly known to those having ordinary skill in the art that the term computer storage media include volatile and non-volatile media, and removable and un-removable media which are implemented in any method or technology for storing information (such as a computer readable instruction, a data structure, a program module or other data). The computer storage media include, but not limited to, an RAM, an ROM, an EEPROM, a flash memory or other memory technologies, a CD-ROM, a Digital Video Disk (DVD) or other optical storage, a cartridge, a tape, a disk storage or other magnetic storage devices, or any other media which can be used for storing expected information and can be accessed by a computer. Moreover, it is commonly known to those having ordinary skill in the art that the communication media generally include the computer readable instruction, the data structure, the program module or other data, such as carriers or other transmission mechanisms, in a modulation data signal, and may include any information delivery media.

INDUSTRIAL APPLICABILITY

Through the technical solutions of the embodiments of the disclosure, the first device sends the optical signal in the first direction to the second device, wherein the optical signal in the first direction includes the direct current optical signal with the first wavelength and the modulated optical signal with the second wavelength; and the second device receives the optical signal in the first direction from the first device, takes a part of the direct current optical signal with the first wavelength as the LO light for coherent reception, performs coherent frequency mixing between the LO light and the modulated optical signal with the second wavelength, and demodulates the modulated optical signal with the second wavelength. In the embodiments of the disclosure, the cost and complexity of coherent detection are reduced by saving an LO laser used for coherent reception.

What is claimed is:

1. A coherent detection implementing apparatus, comprising:

a first transceiver unit, configured to send an optical signal in a first direction to a second device, and receive an optical signal in a second direction from the second device, wherein the optical signal in the first direction comprises a direct current optical signal with a first wavelength and a modulated optical signal with a second wavelength, and the optical signal in the second direction comprises a modulated optical signal with the first wavelength; and a first coherent receiver, connected with the first transceiver unit, and configured to take a part of the direct current optical signal with the first wavelength in the optical signal in the first direction as a Local Oscillator (LO) light for coherent reception, perform coherent frequency mixing between the LO light and the optical signal in the second direction, and demodulate the optical signal in the second direction;

wherein the first transceiver unit comprises a first optical transmitter, a modulation and splitting subunit and an interface subunit that are connected successively, wherein the first optical transmitter is configured to generate an optical signal to be modulated, wherein the optical signal to be modulated comprises the direct current optical signal with the first wavelength and a direct current optical signal with the second wavelength; the modulation and splitting subunit is configured to modulate the direct current optical signal with the second wavelength in the optical signal to be modulated to obtain the modulated optical signal with the second wavelength; and the interface subunit is configured to take the direct current optical signal with the first wavelength and the modulated optical signal with the second wavelength as the optical signal in the first direction, and send the optical signal in the first direction to the second device; and receive the optical signal in the second direction from the second device and send the optical signal in the second direction to the first coherent receiver;

wherein the modulation and splitting subunit comprises a first splitter, a first optical modulator and a combiner that are connected successively, wherein the first splitter is configured to split the optical signal to be modulated into two beams, one of which is the direct current optical signal with the first wavelength and the other of which is the direct current optical signal with the second wavelength, send a part of the beam of the direct current optical signal with the first wavelength to the first coherent receiver and send the other part of the beam of the direct current optical signal with the first wavelength to the combiner, and send the beam of the direct current optical signal with the second wavelength to the first optical modulator; the first optical modulator is configured to modulate the received direct current optical signal with the second wavelength to obtain the modulated optical signal with the second wavelength, and send the modulated optical signal with the second wavelength to the combiner; and the combiner is configured to combine the received direct current optical signal with the first wavelength and the modulated optical signal with the second wavelength into one beam, and send the combined beam to the interface subunit.

2. The apparatus as claimed in claim 1, wherein the first transceiver unit further comprises a polarization rotator;

the polarization rotator is respectively connected with the first coherent receiver and the interface subunit, and is configured to perform polarization conversion on the optical signal in the second direction, and send the optical signal in the second direction to the first coherent receiver.

3. The apparatus as claimed in claim 1, wherein the first coherent receiver comprises: a first optical coupler, a polarization splitter, a first photoelectric detector, a second photoelectric detector and a signal processing module; the polarization splitter is respectively connected with the first optical coupler, the first photoelectric detector and the second photoelectric detector; the signal processing module is respectively connected with the first photoelectric detector and the second photoelectric detector;

the first optical coupler is configured to perform coherent frequency mixing between the LO light and the optical signal in the second direction to generate a frequency mixed optical signal;

the polarization splitter is configured to split the frequency mixed optical signal into polarization optical signals in two directions, send the polarization optical signal in X direction to the first photoelectric detector, and send the polarization optical signal in Y direction to the second photoelectric detector;

the first photoelectric detector is configured to convert the polarization optical signal in the X direction into a first electrical signal, and send the first electrical signal to the signal processing module;

the second photoelectric detector is configured to convert the polarization optical signal in the Y direction into a second electrical signal, and send the second electrical signal to the signal processing module;

the signal processing module is configured to perform Digital Signal Processing (DSP) to the first electrical signal and the second electrical signal to demodulate the optical signal in the second direction.

4. A coherent detection implementing apparatus, comprising:

a transceiver unit, configured to receive an optical signal in a first direction from a first device, wherein the optical signal in the first direction comprises a direct current optical signal with a first wavelength and a modulated optical signal with a second wavelength;

a coherent receiver, connected with the transceiver unit, and configured to take a part of the direct current optical signal with the first wavelength as a Local Oscillator (LO) light for coherent reception, perform coherent frequency mixing between the LO light and the modulated optical signal with the second wavelength, and demodulate the modulated optical signal with the second wavelength;

wherein the transceiver unit comprises a transceiver subunit and a optical transmitter that are connected; the transceiver subunit is configured to receive the optical signal in the first direction from the first device, send a part of the direct current optical signal with the first wavelength to the coherent receiver, send the other part of the direct current optical signal with the first wavelength to the optical transmitter, and receive the modulated optical signal with the first wavelength sent by the optical transmitter, and send the modulated optical signal with the first wavelength to the first device as an optical signal in a second direction; the optical transmitter is configured to modulate the other part of the direct current optical signal with the first wavelength to generate the modulated optical signal with the first wavelength;

wherein the transceiver subunit comprises a signal splitting and amplification module; the signal splitting and amplification module comprises a splitter and an optical amplifier that are connected;

the splitter is configured to split the optical signal in the first direction into two beams, one of which is the direct current optical signal with the first wavelength and the other of which is the modulated optical signal with the second wavelength, send the direct current optical signal with the first wavelength to the optical amplifier, and send the modulated optical signal with the second wavelength to the coherent receiver; the optical amplifier is configured to perform power amplification to the direct current optical signal with the first wavelength, send a part of the direct current optical signal with the first wavelength to the coherent receiver as the LO light for coherent reception, and output the other part of the direct current optical signal with the first wavelength to the optical transmitter; or, the optical amplifier is configured to perform power amplification to the optical signal in the first direction, and output the amplified optical signal in the first direction to the splitter; the splitter is configured to split the amplified optical signal in the first direction into two beams, one of which is the direct current optical signal with the first wavelength and the other of which is the modulated optical signal with the second wavelength, output a part of the direct current optical signal with the first wavelength to the coherent receiver as the LO light for coherent reception, output the other part of the direct current optical signal with the first wavelength to the optical transmitter, and output the modulated optical signal with the second wavelength to the coherent receiver;

wherein the transceiver subunit further comprises a first interface module and a second interface module; the first interface module is configured to output the optical signal in the first direction to the signal splitting and amplification module, and send the modulated optical signal with the first wavelength to the first device as the optical signal in the second direction; the second interface module is configured to output the direct current optical signal with the first wavelength output by the signal splitting and amplification module to the optical transmitter, and output the modulated optical signal with the first wavelength output by the optical transmitter to the first interface module.

5. The apparatus as claimed in claim 4, wherein
the optical transmitter comprises a optical modulator, wherein the optical modulator is a reflective optical modulator.

6. The apparatus as claimed in claim 4, wherein the coherent receiver comprises: a first optical coupler, a polarization splitter, a first photoelectric detector, a second photoelectric detector and a signal processing module; the polarization splitter is respectively connected with the first optical coupler, the first photoelectric detector and the second photoelectric detector; the signal processing module is respectively connected with the first photoelectric detector and the second photoelectric detector;

the first optical coupler is configured to perform coherent frequency mixing between the LO light and the modulated optical signal with the second wavelength to generate a frequency mixed optical signal;

the polarization splitter is configured to split the frequency mixed optical signal into polarization optical signals in two directions, send the polarization optical signal in X direction to the first photoelectric detector, and send the polarization optical signal in Y direction to the second photoelectric detector;

the first photoelectric detector is configured to convert the polarization optical signal in the X direction into a first electrical signal, and send the first electrical signal to the signal processing module;

the second photoelectric detector is configured to convert the polarization optical signal in the Y direction into a second electrical signal, and send the second electrical signal to the signal processing module; and the signal processing module is configured to perform Digital Signal Processing (DSP) to the first electrical signal and the second electrical signal to demodulate the modulated optical signal with the second wavelength.

7. A coherent detection implementing method, comprising:

sending, by a first device, an optical signal in a first direction to a second device, wherein the optical signal in the first direction comprises a direct current optical signal with a first wavelength and a modulated optical signal with a second wavelength;

receiving, by the second device, the optical signal in the first direction from the first device, taking, by the second device, a part of the direct current optical signal with the first wavelength as a Local Oscillator (LO) light for coherent reception, performing, by the second device, coherent frequency mixing between the LO light and the modulated optical signal with the second wavelength, and demodulating, by the second device, the modulated optical signal with the second wavelength;

wherein before sending, by a first device, an optical signal in a first direction to a second device, the method further comprising: generating, by a first optical transmitter in the first device, an optical signal to be modulated, wherein the optical signal to be modulated comprises the direct current optical signal with the first wavelength and a direct current optical signal with the second wavelength; modulating, by a modulation and splitting subunit in the first device, the direct current optical signal with the second wavelength in the optical signal to be modulated to obtain the modulated optical signal with the second wavelength, wherein the direct current optical signal with the first wavelength and the modulated optical signal with the second wavelength are taken as the optical signal in the first direction;

wherein the modulation and splitting subunit comprises a first splitter, a first optical modulator and a combiner that are connected successively; modulating, by the modulation and splitting subunit in the first device, the direct current optical signal with the second wavelength in the optical signal to be modulated to obtain the modulated optical signal with the second wavelength, comprises: splitting, by the first splitter, the optical signal to be modulated into two beams, one of which is the direct current optical signal with the first wavelength and the other of which is the direct current optical signal with the second wavelength, sending, by the first splitter, a part of the beam of the direct current optical signal with the first wavelength to the first coherent receiver, sending, by the first splitter, the other part of the beam of the direct current optical signal with the first wavelength to the combiner, sending, by the first splitter, the beam of the direct current optical signal with the second wavelength to the first optical modulator; modulating, by the first optical modulator, the received direct current optical signal with the second wavelength to obtain the modulated optical signal with the second wavelength, sending, by the first optical modulator, the modulated optical signal with the second wavelength to the combiner; combining, by the combiner, the received direct current optical signal with the first wavelength and the modulated optical signal with the second wavelength into one beam, and sending, by the combiner, the combined beam to the interface subunit.

8. The method as claimed in claim 7, further comprising:

modulating, by the second device, the other part of the direct current optical signal with the first wavelength to generate a modulated optical signal with the first wavelength, and sending the modulated optical signal with the first wavelength to the first device as an optical signal in a second direction;

receiving, by the first device, the optical signal in the second direction from the second device, taking, by the first device, a part of the direct current optical signal with the first wavelength in the optical signal in the first direction as the LO light for coherent reception, performing, by the first device, coherent frequency mixing between the LO light and the optical signal in the second direction, and demodulating, by the first device, the optical signal in the second direction.

* * * * *